US010328955B2

(12) United States Patent
Yamaguchi

(10) Patent No.: US 10,328,955 B2
(45) Date of Patent: Jun. 25, 2019

(54) PLUG DOOR OPENING-CLOSING DEVICE AND PLUG DOOR DEVICE

(71) Applicant: NABTESCO CORPORATION, Tokyo (JP)

(72) Inventor: Atsuhito Yamaguchi, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 15/900,126

(22) Filed: Feb. 20, 2018

(65) Prior Publication Data

US 2018/0170405 A1 Jun. 21, 2018

Related U.S. Application Data

(63) Continuation of application No. 14/853,636, filed on Sep. 14, 2015.

(30) Foreign Application Priority Data

Sep. 19, 2014 (JP) ................................ 2014-191902

(51) Int. Cl.
*B61D 19/00* (2006.01)
*E05D 13/00* (2006.01)
(Continued)

(52) U.S. Cl.
CPC .......... *B61D 19/005* (2013.01); *E05D 13/00* (2013.01); *E05D 15/0621* (2013.01); (Continued)

(58) Field of Classification Search
CPC . B61D 19/005; E05F 15/652; E05D 15/1068; E05Y 2900/51
See application file for complete search history.

(56) References Cited

U.S. PATENT DOCUMENTS

| | | | | |
|---|---|---|---|---|
| 1,808,242 A | | 6/1931 | Templar | |
| 2,117,316 A | * | 5/1938 | Gullborg ................ | E05F 11/40 292/251 |

(Continued)

FOREIGN PATENT DOCUMENTS

| | | | |
|---|---|---|---|
| CH | 618493 | A5 | 7/1980 |
| CN | 1344633 | A | 4/2002 |

(Continued)

OTHER PUBLICATIONS

Notification of First Office Action Chinese Patent Application No. 201710117594.8 dated Sep. 29, 2017 with English translation.

(Continued)

*Primary Examiner* — Gregory J Strimbu

(74) *Attorney, Agent, or Firm* — Pillsbury Winthrop Shaw Pittman, LLP

(57) ABSTRACT

A plug door opening-closing apparatus, which is adapted for use with a vehicle having a vehicle front-rear direction and a vehicle width direction, includes a door hanger configured to be coupled to a door panel of the vehicle, a movable guide configured to guide movement of the door hanger in the front-rear direction and move in the width direction, a guide support member that guides movement of the movable guide in the width direction, and an interlock mechanism mechanically connected to the movable guide.

7 Claims, 14 Drawing Sheets

(51) Int. Cl.

| | |
|---|---|
| ***E05D 15/06*** | (2006.01) |
| ***E05F 15/00*** | (2015.01) |
| ***E05D 15/10*** | (2006.01) |
| ***E05F 15/652*** | (2015.01) |

(52) U.S. Cl.

CPC ..... *E05D 15/1065* (2013.01); *E05D 15/1068* (2013.01); *E05F 15/00* (2013.01); *E05F 15/652* (2015.01); *E05D 2015/1076* (2013.01); *E05Y 2201/62* (2013.01); *E05Y 2900/51* (2013.01)

(56) References Cited

U.S. PATENT DOCUMENTS

| | | | | |
|---|---|---|---|---|
| 3,202,414 | A * | 8/1965 | Simmons | E05F 15/622 49/280 |
| 3,204,170 | A * | 8/1965 | Monks | H02G 5/04 191/23 A |
| 3,398,484 | A * | 8/1968 | Toru | E05F 15/622 318/268 |
| 4,028,850 | A | 6/1977 | Marzocco | |
| 4,091,570 | A | 5/1978 | Favrel | |
| 4,669,220 | A * | 6/1987 | Dilcher | B61D 19/008 49/219 |
| 4,916,963 | A * | 4/1990 | Takei | B23Q 5/402 74/89.31 |
| 5,253,452 | A | 10/1993 | Goldbach | |
| 5,263,280 | A | 11/1993 | Dilcher | |
| 5,438,800 | A | 8/1995 | Porter | |
| 5,483,769 | A | 1/1996 | Zweili | |
| 5,704,250 | A * | 1/1998 | Black | B23Q 5/408 318/48 |
| 5,893,236 | A | 4/1999 | Krbec | |
| 6,282,970 | B1 | 9/2001 | Oakley | |
| 6,385,910 | B1 | 5/2002 | Smink | |
| 6,539,669 | B1 | 4/2003 | Heidrich | |
| 6,684,567 | B2 * | 2/2004 | Heidrich | B61D 19/008 49/213 |
| 9,017,419 | B1 * | 4/2015 | Landry | A61F 2/66 310/156.01 |
| 2002/0092236 | A1 | 7/2002 | Heffner et al. | |
| 2002/0194783 | A1 | 12/2002 | Stojc et al. | |
| 2006/0225356 | A1 | 10/2006 | Jarolim | |
| 2011/0010998 | A1 | 1/2011 | Elliott et al. | |
| 2011/0198883 | A1 | 8/2011 | Heuel et al. | |
| 2013/0298706 | A1 * | 11/2013 | Linnenkohl | B60J 5/06 74/89 |
| 2016/0319583 | A1 | 11/2016 | Ritt | |
| 2017/0284139 | A1 | 10/2017 | Yamaguchi | |

FOREIGN PATENT DOCUMENTS

| | | | |
|---|---|---|---|
| CN | 1388021 | A | 1/2003 |
| CN | 101117876 | A | 2/2008 |
| CN | 101818601 | A | 9/2010 |
| CN | 201566632 | U | 9/2010 |
| CN | 201835659 | U | 5/2011 |
| CN | 202596413 | U | 12/2012 |
| CN | 203796060 | U | 8/2014 |
| CN | 104039626 | A | 9/2014 |
| EP | 0195880 | A2 | 10/1986 |
| EP | 1280690 | B1 | 12/2005 |
| GB | 1548928 | A | 7/1979 |
| GB | 1548929 | A | 7/1979 |
| JP | 60-148475 | U | 10/1985 |
| JP | 1-311846 | A | 12/1989 |
| JP | H04-198577 | A | 7/1992 |
| JP | 8-118264 | A | 5/1996 |
| JP | 2002-180731 | A | 6/2002 |
| JP | 2012-188858 | A | 10/2012 |

OTHER PUBLICATIONS

Office Action issued in United Kingdom patent Application No. GB 1516369.4 dated Mar. 9, 2016.

Office Action issued in German Patent Application No. 10 2015 217 393.3, dated Jan. 4, 2017.

Office Action issued in United Kingdom Patent Application No. GB1701331.9, dated Feb. 20, 2017.

First Office Action as issued in Chinese Patent Application No. 201510594910.1 dated Oct. 17, 2016.

Search Report as issued in French Patent Application No. 1558676 dated May 13, 2016.

Non-final Office Action dated Sep. 24, 2018 issued in corresponding U.S. Appl. No. 14/853,636.

Final Office Action issued in corresponding U.S. Appl. No. 14/853,636 dated Jun. 7, 2017.

Final Office Action U.S. Appl. No. 14/853,636 dated Apr. 3, 2019.

Notification of Reasons for Refusal dated Apr. 23, 2019 issued in corresponding Japanese Patent Application No. 2018-112522 with English translation.

* cited by examiner

PLUG DOOR OPENING-CLOSING DEVICE AND PLUG DOOR DEVICE

CROSS-REFERENCE TO RELATED APPLICATIONS

This Application is a Continuation Application of U.S. Ser. No. 14/853,636, filed Sep. 14, 2015, which claims the benefit of priority from prior Japanese Patent Application No. 2014-191902, filed on Sep. 19, 2014. The subject matter of each is incorporated herein by reference in entirety.

FIELD

The present invention relates to a plug door opening-closing apparatus that moves a door panel in a vehicle front-rear direction and a vehicle width direction and a plug door device including the plug door opening-closing apparatus.

BACKGROUND

Japanese Laid-Open Patent Publication No. 2012-188858 describes a conventional sliding plug door device for a railway vehicle. The plug door device includes a plug door opening-closing apparatus that performs an operation for moving a door panel in the widthwise direction of a railway vehicle when sliding the door panel in the front-rear direction of the railway vehicle, that is, the so-called plugging operation. The plug door device further includes a fixed base and a movable base. The fixed base includes a front rail and a rear rail. The movable base includes a front roller and a rear roller respectively coupled to the front rail and the rear rail. The plug door opening-closing apparatus is mounted on the movable base. The front rail and the rear rail are fixed to a side wall of the vehicle body so that the plug door opening-closing apparatus is held in between in the front-rear direction. Each rail extends in the vehicle width direction. The movable base is movably supported by the two rails on the fixed base. When force that presses the movable base in the vehicle width direction is applied to the movable base, the front and rear rollers roll on the front and rear rails. This moves the movable base and the door panel relative to the fixed base in the vehicle width direction.

SUMMARY

In many cases, a plug door device including front and rear rollers and front and rear rails has predetermined gaps between the rollers and the corresponding rails. When the plug door device of the '858 publication performs the plugging operation, such gaps may cause the movable base to be inclined relative to the vehicle front-rear direction. This causes the jamming of the front and rear rollers and the front and rear rails. In this specification, the jamming refers to a state in which a movable portion of a mechanical structure such as a sliding portion, a link mechanism, and a nut and a bolt is at least temporarily stuck and the movable portion is hindered from smoothly moving.

It is an object of the present invention to provide a plug door opening-closing apparatus and a plug door device that allow a door to stably move in the vehicle width direction.

One aspect of the present invention is a plug door opening-closing apparatus adapted for use with a vehicle having a vehicle front-rear direction and a vehicle width direction. The plug door opening-closing apparatus includes a door hanger, a movable guide, a guide support member, and an interlock mechanism. The door hanger is capable of coupling a door panel of the vehicle. The movable guide is configured to guide movement of the door hanger in the vehicle front-rear direction and move in the vehicle width direction. The guide support member guides movement of the movable guide in the vehicle width direction. The interlock mechanism is mechanically connected to the movable guide. The interlock mechanism conforms a movement amount of a first portion of the movable guide to a movement amount of a second portion of the movable guide.

In the above structure, the interlock mechanism conforms the movement amount of the first portion to the movement amount of the second portion. This prevents the movable guide, which is supported by the guide support member, from jamming in the vehicle front-rear direction when the movable guide moves in the vehicle width direction. Thus, the movable guide smoothly moves in the width direction, and movement of the door panel is stabilized in the width direction. The first portion and the second portion refer to portions of the movable guide that are located at different positions in the front-rear direction. The term "conform" includes complete conformance and also a slight difference to an extent that does not hinder movement in the width direction X.

In some implementations, the interlock mechanism includes a rotatable interlock shaft extending in the vehicle front-rear direction, and a plurality of link mechanisms linking the interlock shaft to the first portion and the second portion of the movable guide.

In the above structure, the movement amount of the first portion and the movement amount of the second portion may conform without using electrical components. Thus, the interlock mechanism functions even when no electric power is supplied.

In some implementations, each link mechanism includes a first link, which is coupled to the interlock shaft and rotated integrally with the interlock shaft, and a second link, which is coupled to the movable guide. In each link mechanism, the first link and the second link form a revolute pair.

For example, when the interlock mechanism has a structure in which force is transmitted with a rack and pinion mechanism, pitches of racks would need to be aligned. This requires high coupling precision and is burdensome. In this regard, the plug door opening-closing apparatus includes the interlock mechanism that transmits force using a plurality of links. This simplifies the coupling compared to when a rack and pinion mechanism is used.

In some implementations, the first portion and the second portion correspond to two opposite ends of the movable guide in the vehicle front-rear direction.

In the above structure, the door hanger moves between the front end and the rear end of the movable guide, to which the links are coupled. This allows for an increase in the length in which the door hanger moves on the movable guide compared to when the links are coupled to intermediate portions of the movable guide in the front-rear direction. More specifically, the open width of the door panel may be increased without increasing the size of the plug door opening-closing apparatus in the front-rear direction.

In some implementations, the second link is rotatable relative to the movable guide.

In the above structure, when coupling the first link and the second link, the second link may be rotated relative to the movable guide. This improves the task for coupling each link compared to when the second link is rotated together with the movable guide when coupled to the first link.

In some implementations, the movable guide is located at a first position in the vehicle width direction, and the interlock shaft is location at a second position in the vehicle width direction. The second position is located toward an inner side in the vehicle width direction from the first position.

In the above structure, the joint portion of the first link and the second link is located toward the vehicle inner side from the movable guide. This facilitates the task for coupling each link from the vehicle inner side.

In some implementations, the plug door opening-closing apparatus further includes a phase setting unit that sets a phase of the first link when coupled to the interlock shaft about an axis of the interlock shaft.

In the above structure, the coupling phases of the first links of the link mechanisms may conform to each other due to the phase setting unit.

In some implementations, the phase setting unit includes a hole, which is provided for each of the first link and the interlock shaft, and a screw inserted into the holes. The screw fastens the first link and the interlock shaft.

In the above structure, the screw sets the phase of the first link relative to the interlock shaft and positions the first link relative to the interlock shaft in the front-rear direction. Thus, the operation for engaging the screw simultaneously performs the setting of the phase, the positioning in the vehicle front-rear direction, and the fixing. This reduces the coupling task.

In some implementations, the first link is a crank-shaped mechanical component including a first arm coupled to the interlock shaft and rotated integrally with the interlock shaft, a second arm coupled to the second link, and a connection portion connecting the first arm and the second arm. The first arm is located toward a longitudinally outer side of the interlock shaft from the second arm. The second link and the first arm are located at the same side of the second arm in the vehicle front-rear direction.

The above structure allows for an increase in the length in which the door hanger moves on the movable guide compared to when the second link and the first arm are located at opposite sides of the second arm in the front-rear direction. More specifically, the open width of the door panel may be increased without enlarging the plug door opening-closing apparatus in the vehicle front-rear direction.

In some implementations, the plug door opening-closing apparatus further includes a rail plate that supports an inclined rail. The inclined rail includes an inclined portion, which is inclined relative to the vehicle width direction and the vehicle front-rear direction, and a straight rail, which extends in the vehicle front-rear direction. The rail plate includes a flange that extends in the vehicle front-rear direction.

In the above structure, the flange increases the rigidity of the rail plate and hinders deformation of the inclined rail. This stabilizes movement of the door panel. Additionally, the first arm is located at a longitudinally outer side of the interlock shaft. This prevents the flange from contacting the first arm even when the size of the flange is set to be increased in the front-rear direction. Thus, the rigidity of the rail plate is further increased.

In some implementations, the guide support member is a rail that extends in the vehicle width direction, and the movable guide is provided with a rotary body that rolls on the rail.

The above structure decreases friction between the movable guide and the rail. Thus, the movable guide moves in the width direction in a further smooth manner.

In some implementations, the movable guide is rotatable, and the rotary body is fixed to the movable guide.

The above structure eliminates the need for a rotary shaft and a bearing structure between the movable guide and the rotary body. Thus, the structure is simplified.

In some implementations, the plug door opening-closing apparatus further includes a stopper that cooperates with the rail to hold the rotary body in a radial direction of the rotary body.

When separation of the rotary body from the rail results in a plurality of links having different bent angles, the movable guide may be inclined. In this regard, the stopper hinders the separation of the rotary body from the rail. Thus, the bent angles of the links are maintained substantially the same. This stabilizes movement of the movable guide in the width direction.

In some implementations, the plug door opening-closing apparatus further includes a door driving mechanism and a link member. The door driving mechanism includes a threaded shaft extending in the vehicle front-rear direction and a nut engaged with the threaded shaft. The nut moves the door hanger in the vehicle front-rear direction. The link member links the threaded shaft and the movable guide.

In the above structure, the movable guide and the threaded shaft integrally move in the vehicle width direction. This provides the threaded shaft with the effect of the movable guide obtained due to the interlock mechanism. Consequently, the threaded shaft smoothly moves in the width direction, and the movement of the door panel in the width direction is further stabilized.

Additionally, when the movable guide rotates while moving in the width direction, the movable guide only needs to be arranged to be rotatable relative to the link member. This restricts interference of rotation of the movable guide by the link member. Thus, the movable guide may smoothly move in the width direction.

Another aspect of the present invention is a plug door device that includes a door panel for a vehicle and one of the plug door opening-closing apparatuses described above.

The aspects of the invention provide a plug door opening-closing apparatus and a plug door device that allow a door to stably move in the vehicle width direction. Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

Figure 1:
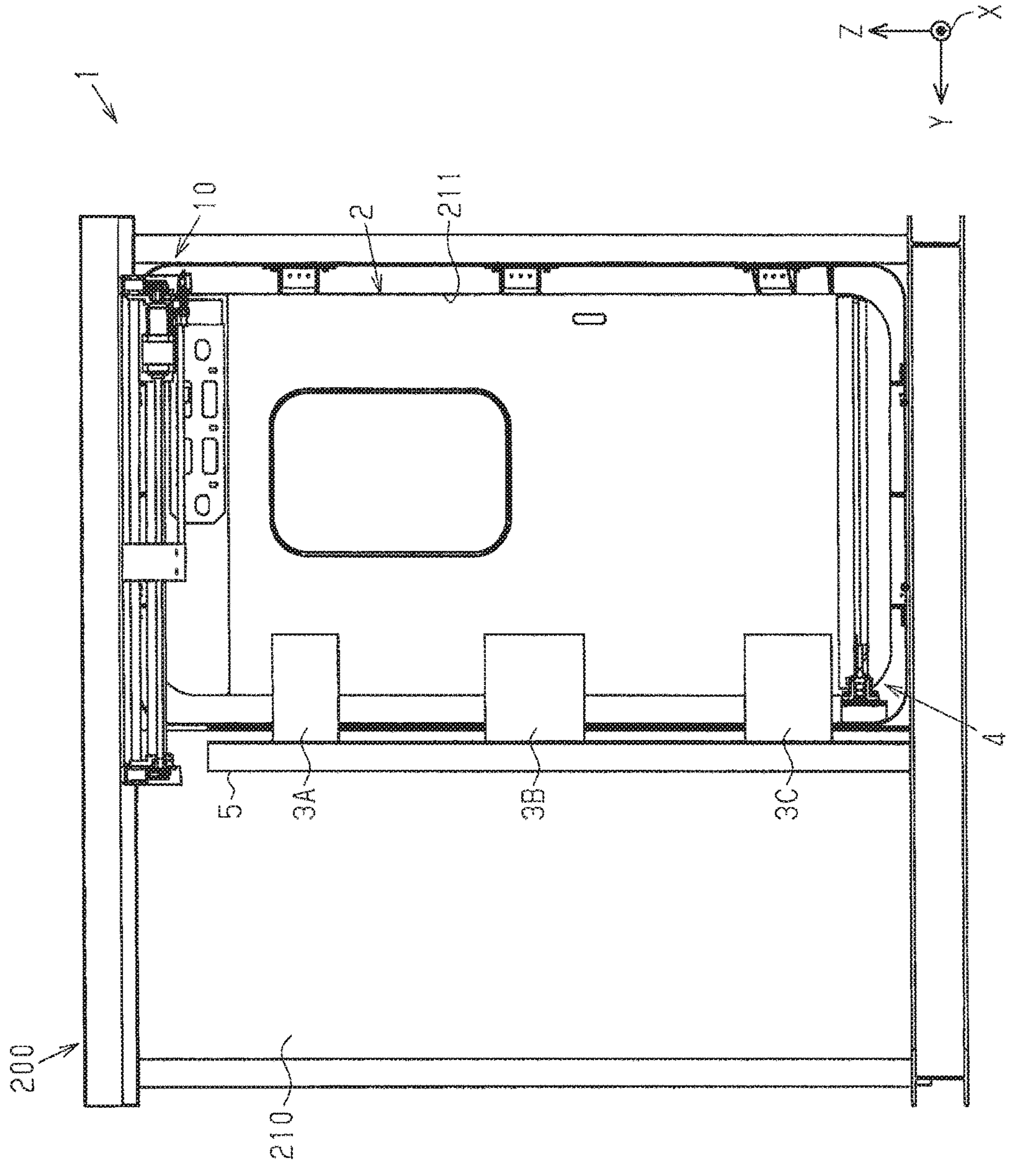
FIG. 1 is a front view showing one embodiment of a plug door device.

With reference to FIG. 1, a plug door device 1 for a vehicle 200 will now be described. In the description, hereafter, axes X, Y, Z in the orthogonal coordinate system of FIG. 1 refer to a vehicle width direction X, a vehicle front-rear direction Y, and a vehicle height direction Z, respectively.

The width direction X may refer to a plugging motion direction and an unplugging motion direction of a door panel 2. In some examples, the width direction X refers to a direction that is intersected with or orthogonal to an outer or inner surface of the door panel 2. The front-rear direction Y may refer to a sliding motion direction of the door panel 2. The front-rear direction Y may refer to a sliding motion direction of the door panel 2. In some examples, the front-rear direction Y refers to a horizontal direction that is substantially parallel to the outer or inner surface of the door panel 2.

An entrance 211 of the vehicle 200 is formed in a vehicle side wall 210 of the vehicle 200. A support pole 5, which extends in the height direction Z, is coupled to the vehicle side wall 210 beside the entrance 211. The plug door device 1 is coupled to the vehicle side wall 210 proximate to the entrance 211.

The plug door device 1 includes the door panel 2, which corresponds to the entrance 211, and a plug door opening-closing apparatus 10, which moves the door panel 2 in the width direction X and the front-rear direction Y. The plug door device 1 supports the door panel 2 so that the outer surface of the vehicle side wall 210 is flush with the outer surface of the door panel 2 when the door panel 2 is fully closed and entirely covers the entrance 211. The plug door opening-closing apparatus 10 is arranged on an upper end of the door panel 2.

The plug door device 1 includes three lock units 3A to 3C, which restrict movement of the door panel 2 in the width direction X and the front-rear direction Y, and a swing arm mechanism 4, which guides or assists movement of the door panel 2 in the width direction X and the front-rear direction Y.

The lock unit 3A is coupled to an upper portion of the support pole 5. The lock unit 3B is coupled to a middle portion of the support pole 5 in the height direction Z. The lock unit 3C is coupled to a lower portion of the support pole 5. The lock units 3A and 3C each include an electric motor (not shown) and a lock piece (not shown) used for holding the door panel 2. When the door panel 2 is fully closed, the lock units 3A and 3C drive the electric motors to move the lock pieces toward the door panel 2. Consequently, the door panel 2 is confined in the width direction X and the front-rear direction Y. The lock unit 3B includes a solenoid (not shown) and a lock piece (not shown). When the door panel 2 is fully closed, the lock piece of the lock unit 3B locks the door panel 2.

When opening the door panel 2, the solenoid and the electric motors are driven in a manner reversed from the above operation.

The swing arm mechanism 4 is located at a lower position than the lock unit 3C. The swing arm mechanism 4 includes a swing arm, which supports a lower portion of the door panel 2. When the swing arm is rotated to an outer side in the width direction X of the vehicle together with the door panel 2, the swing arm mechanism 4 guides or assists the unplugging motion of the door panel 2, that is, a motion in which the door panel 2 is moved to the outer side of the vehicle side wall 210.

The structure of the plug door opening-closing apparatus 10 will now be described with reference to FIGS. 2 to 7. FIGS. 2 to 7 each show the layout of components in the plug door opening-closing apparatus 10 when the door panel 2 (refer to FIG. 1) is fully closed.

Figure 2:
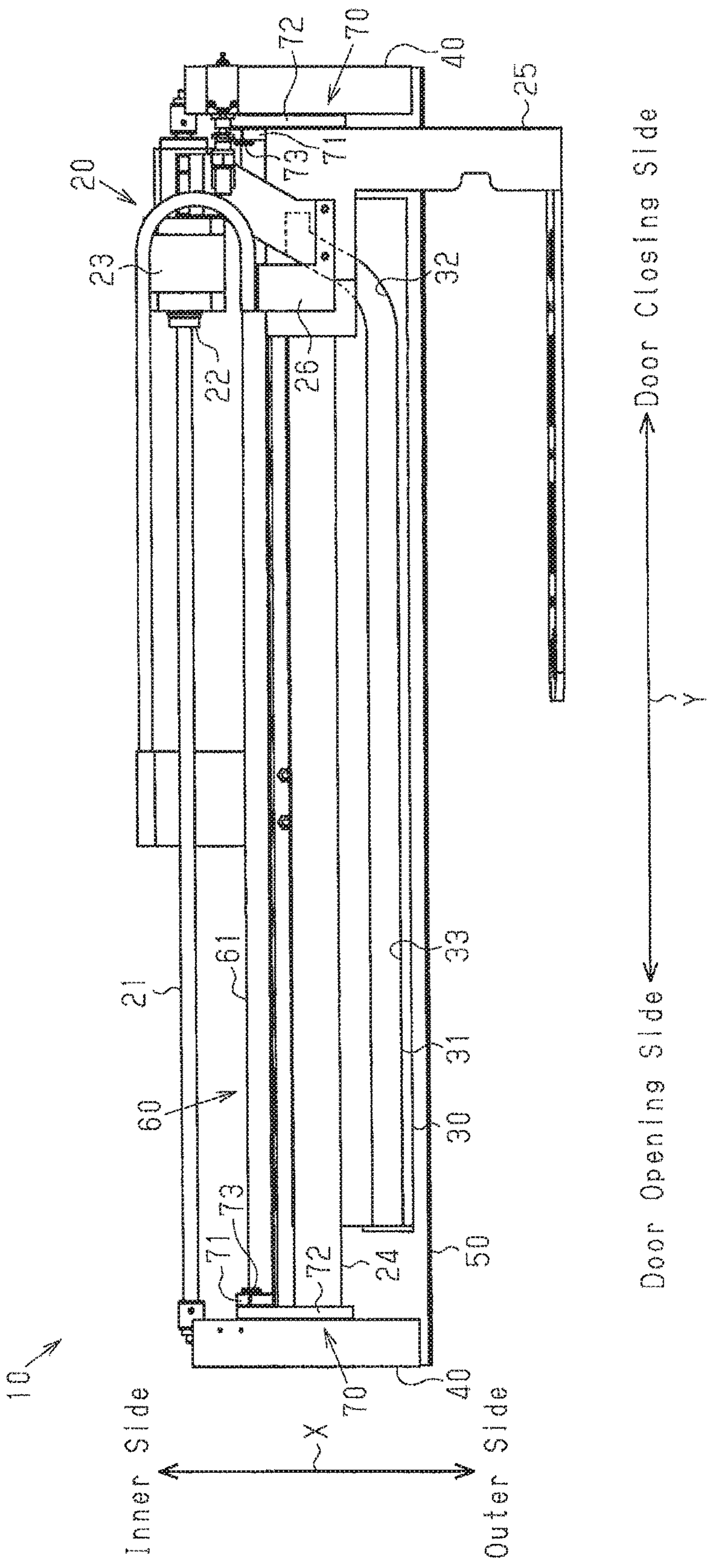
FIG. 2 is a bottom view showing the plug door device of FIG. 1.

As shown in FIG. 2, the plug door opening-closing apparatus 10 includes a door driving mechanism 20, which moves the door panel 2 in the width direction X and the front-rear direction Y, a rail block 30, which guides the movement of the door panel 2 in the width direction X and the front-rear direction Y, and two frames 40, which support the door driving mechanism 20.

The rail block 30 is supported by a rail plate 50, which is fixed to the vehicle side wall 210 (refer to FIG. 1). The rail block 30 includes an inclined rail 31 having a groove that opens outward. The inclined rail 31 includes an inclined portion 32 and a straight portion 33. The inclined portion 32 is inclined toward the vehicle outer side as extending toward a door opening side. The straight portion 33 extends in the front-rear direction Y.

The door driving mechanism 20 includes a threaded shaft 21 extending in the front-rear direction Y, a nut 22, which is engaged with the threaded shaft 21 and moves on the threaded shaft 21, and an electric motor 23, which rotates the nut 22. The threaded shaft 21, the nut 22, and the motor 23 are arranged at an inner side in the width direction X of the vehicle from the rail block 30. The motor 23 may incorporate the nut 22.

Additionally, the door driving mechanism 20 includes a movable guide 24 and a door hanger 25. The movable guide 24 may be a single elongated member that extends in the front-rear direction Y and is movable relative to the frame 40 in the width direction X. The door hanger 25 is supported by the movable guide 24 and movable in the front-rear direction Y. The upper end of the door panel 2 is coupled to the door hanger 25. The movable guide 24 may be an elongated member and is, for example, a pipe, preferably, a tubular pipe. The movable guide 24 is located toward the vehicle outer side from the threaded shaft 21 and parallel to the threaded shaft 21. The door hanger 25 includes a roller (not shown), which rolls in the inclined rail 31 when the door hanger 25 moves. The door hanger 25 is coupled to the motor 23 by a coupling plate 26.

The two frames 40 are located on front and rear ends of the plug door opening-closing apparatus 10 and fixed to the vehicle side wall 210.

Figure 3:
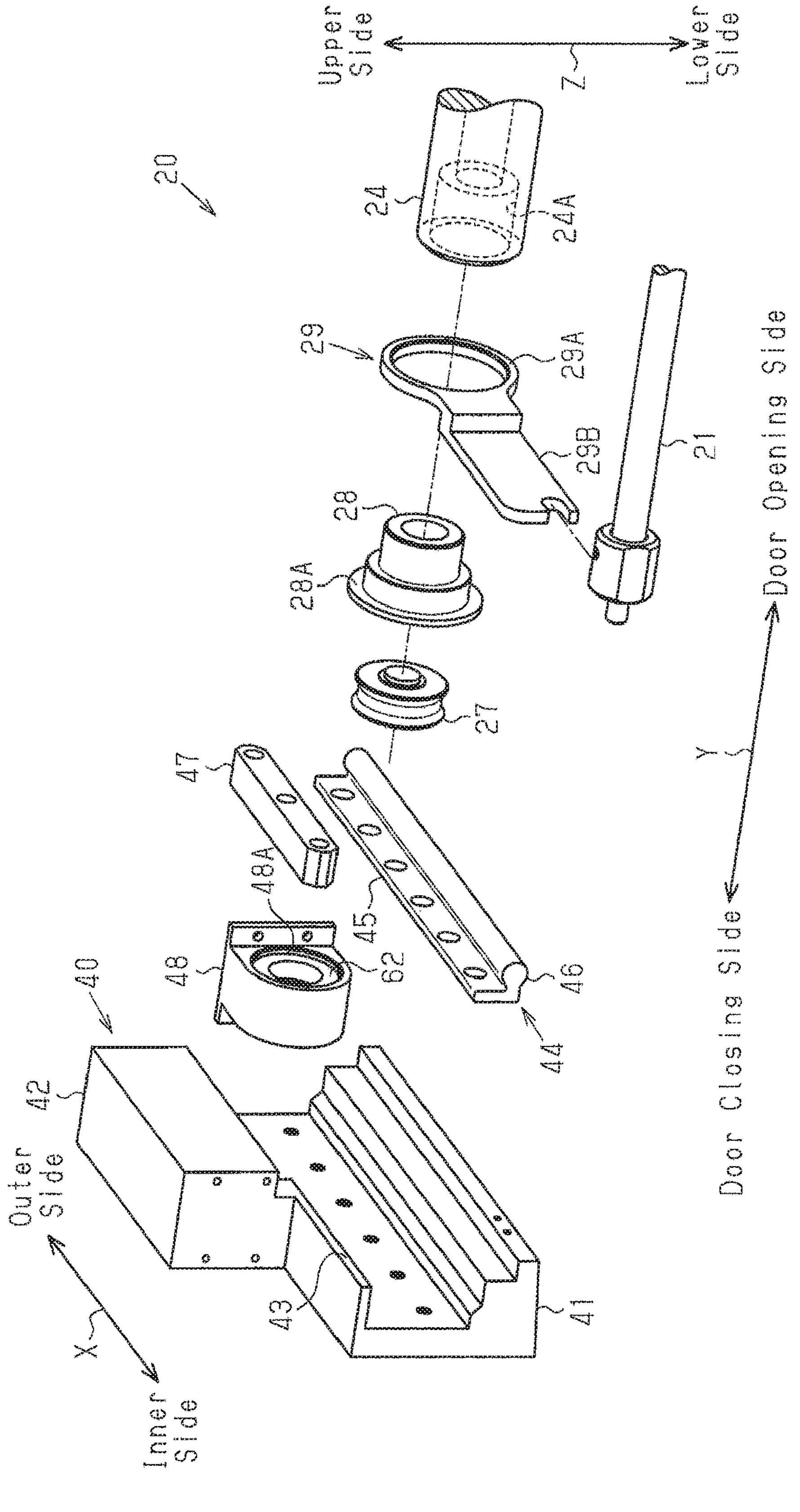
FIG. 3 is an exploded perspective view showing a portion of a door driving mechanism of FIG. 2.

As shown in FIG. 3, each frame 40 includes a base 41 extending in the width direction X and an upper portion 42 extending upward from a portion of the base 41 which is located at the outer side in the width direction X of the vehicle.

The base 41 is L-shaped. A portion of the upper end of the base 41 located at the inner side in the width direction X of the vehicle includes a cover 43 projecting toward the center of the plug door opening-closing apparatus 10 in the front-rear direction Y. A rail 44, which functions as a guide support member that guides movement of the movable guide 24 in the width direction X, is coupled to the base 41 and located at a lower position than the cover 43. The rail 44 includes a plate-like attachment portion 45, which extends in the width direction X and is coupled to the base 41 with bolts (not shown). A support portion 46 extends from the lower end of the attachment portion 45 in the width direction X.

A rotary body 27, which is rotatable together with the movable guide 24 about the center axis of the movable guide 24, is located on the support portion 46. The rotary body 27 is fixed to an end coupler 28 (coupling member), which is coupled to an end of the movable guide 24 in the front-rear direction Y. The end coupler 28 is, for example, tubular and fitted into a hollow portion 24A of the movable guide 24. A flange 28A is formed on an end of the end coupler 28 that is located toward the rotary body 27 in the front-rear direction Y.

Here, the rotary body 27 may be arranged to be rotatable relative to the movable guide 24 about the center axis of the movable guide 24.

A link arm 29 (link member), which links the movable guide 24 and the threaded shaft 21, is coupled to the end coupler 28 so that the link arm 29 comes into contact with the flange 28A in the front-rear direction Y. The link arm 29 includes an annular guide link portion 29A and a crank-like plate 29B extending from the guide link portion 29A. The guide link portion 29A is coupled to the end coupler 28 and rotatable relative to the end coupler 28. An end of the plate 29B to which the threaded shaft 21 is coupled is located closer, in the front-rear direction Y, to the attachment portion 45 of the rail 44 than an end of the plate 29B located toward the guide link portion 29A. The threaded shaft 21 is coupled to an end of the plate 29B located at the inner side in the width direction X so that the threaded shaft 21 cannot rotate relative to the plate 29B.

The upper portion 42 of the frame 40 projects from the upper end of the base 41 toward the center of the plug door opening-closing apparatus 10 in the front-rear direction Y. A stopper 47, which extends in the width direction X, is fixed to the lower end of the upper portion 42. In the height direction Z, the lower surface of the stopper 47 is located in the same position as the lower surface of the cover 43. The leveled lower surfaces prevent the breakage of the rotary body 27 that would occur when the rotary body 27 strikes a corner of the cover 43 or the stopper 47.

A holding member 48 is fixed to an end surface of the upper portion 42 located at the vehicle inner side. The holding member 48 is arranged so that the holding member 48 is located at an upper position than the cover 43 and overlapped with the cover 43. A through hole 48A extends through the holding member 48 in the front-rear direction Y. The outer ring of a ball bearing 62 is coupled to the inner wall defining the through hole 48A.

Figure 4:
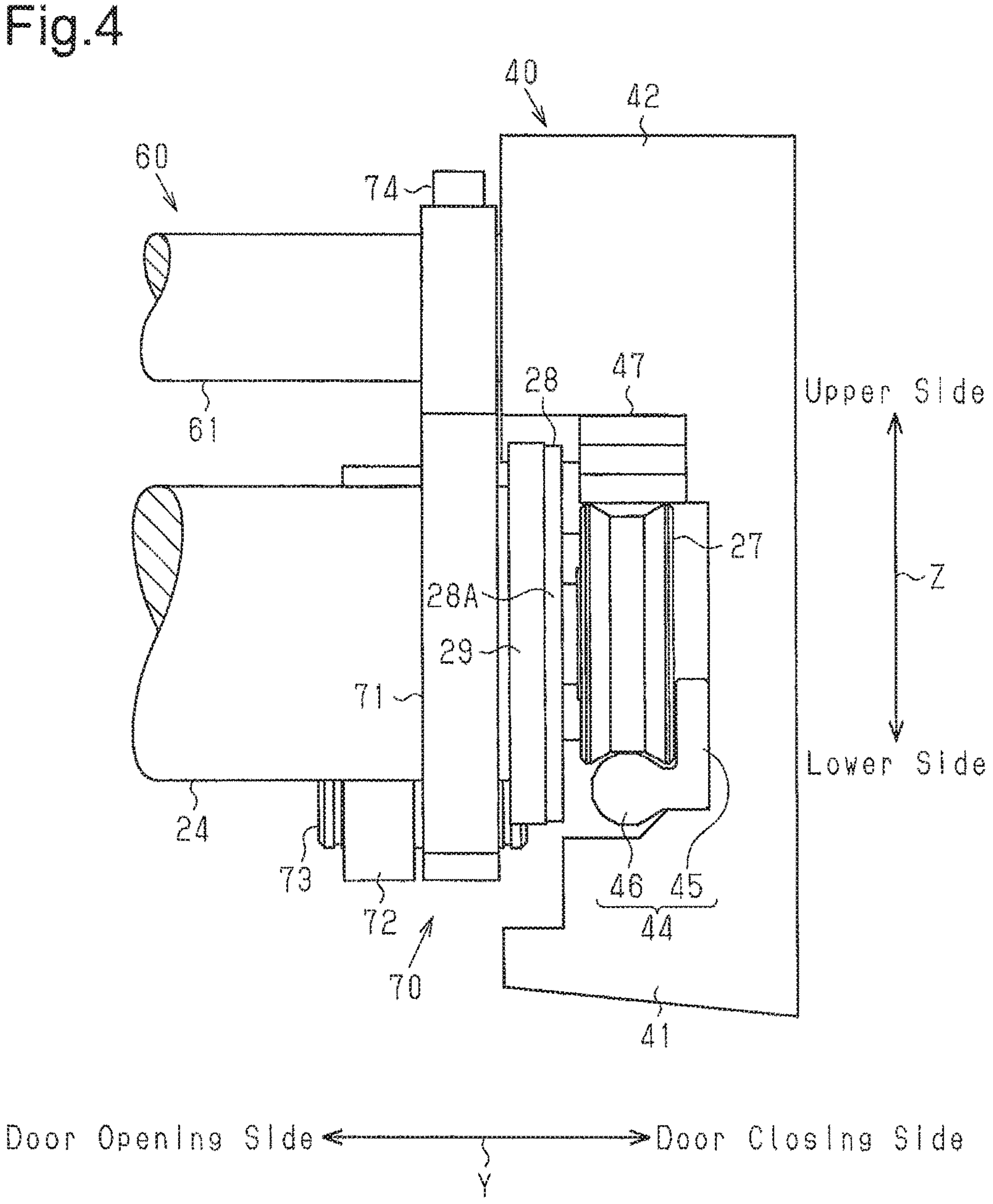
FIG. 4 is a rear view showing a frame of FIG. 2 and its surrounding.

As shown in FIG. 4, the attachment portion 45 of the rail 44 is in contact with the base 41 in the front-rear direction Y. The lower end of the attachment portion is in contact with the base 41 in the height direction Z. Additionally, a lower portion of the rotary body 27, which is coupled to the support portion 46 of the rail 44, is opposed to the attachment portion 45 in the front-rear direction Y with a slight gap located in between. The rotary body 27 is held between the stopper 47 and the support portion 46 in the radial direction of the rotary body 27 (e.g., height direction Z). A slight gap is formed between the rotary body 27 and the stopper 47 in the height direction Z.

As shown in FIG. 2, the plug door opening-closing apparatus 10 includes an interlock mechanism 60, which conforms movement amounts of two opposite ends of the movable guide 24 in the width direction X. The interlock mechanism 60 includes an interlock shaft 61 and two link mechanisms 70, which link two opposite ends of the interlock shaft 61 in the front-rear direction Y and two opposite ends of the movable guide 24 in the front-rear direction Y. The two opposite ends of the movable guide 24 in the front-rear direction Y correspond to a first portion and a second portion. The interlock mechanism 60 conforms the movement amount of the first portion of the movable guide 24 to the movement amount of the second portion of the movable guide 24. The movement amount of the first portion and the movement amount of the second portion refer to movement amounts in the same width direction X. The interlock mechanisms 60 is mechanically connected to the movable guide 24 so that the first portion and the second portion of the movable guide 24 move in parallel and in the same width direction X by the same movement amount, that is, perform parallel movement.

The two opposite ends of the interlock shaft 61 in the front-rear direction Y and the surrounds have the same structure. Also, the two link mechanisms 70 have the same structure. Thus, the structure of one end of the interlock shaft 61 in the front-rear direction Y and the structure of one of the link mechanisms 70 will be described below with reference to FIGS. 5 to 7. The structure of the other end of the interlock shaft 61 in the front-rear direction Y and the structure of the other link mechanism 70 will not be described.

Figure 6:
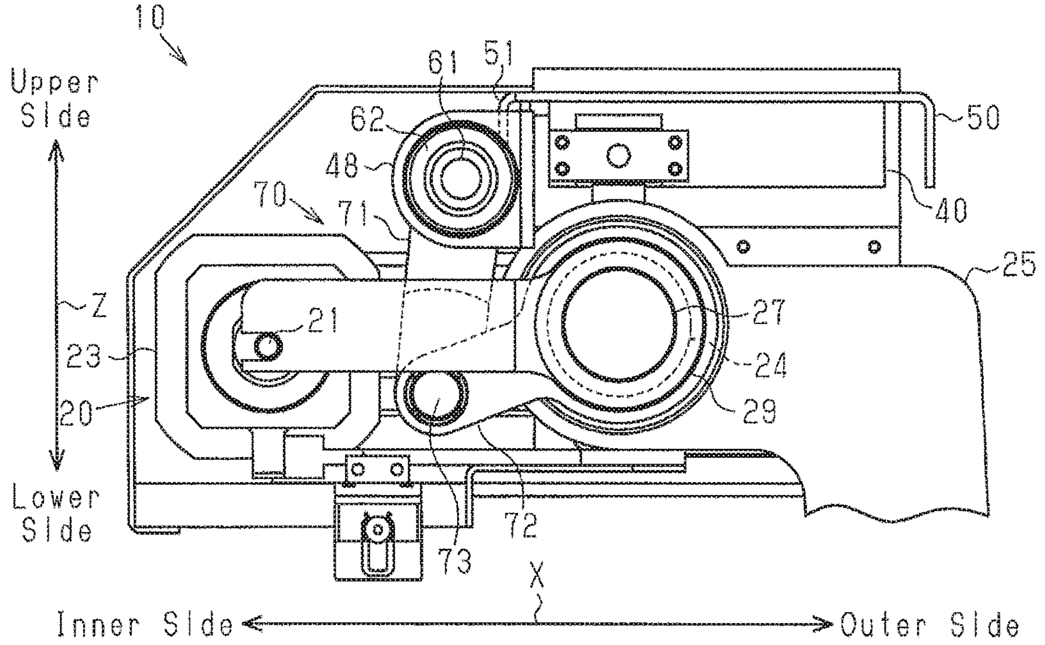
FIG. 6 is a side view showing a plug door opening-closing apparatus.

As shown in FIG. 6, the interlock shaft 61 is located at an upper position than the movable guide 24 and toward the vehicle inner side from the movable guide 24. Additionally, the interlock shaft 61 is located at an upper position than the motor 23 and the threaded shaft 21 and toward the vehicle outer side from the motor 23 and the threaded shaft 21. Further, the interlock shaft 61 is located toward the vehicle inner side from a flange 51. The flange 51 is formed by bending an end portion of the rail plate 50 downward that is located at an inner side in the width direction X.

Figure 5:
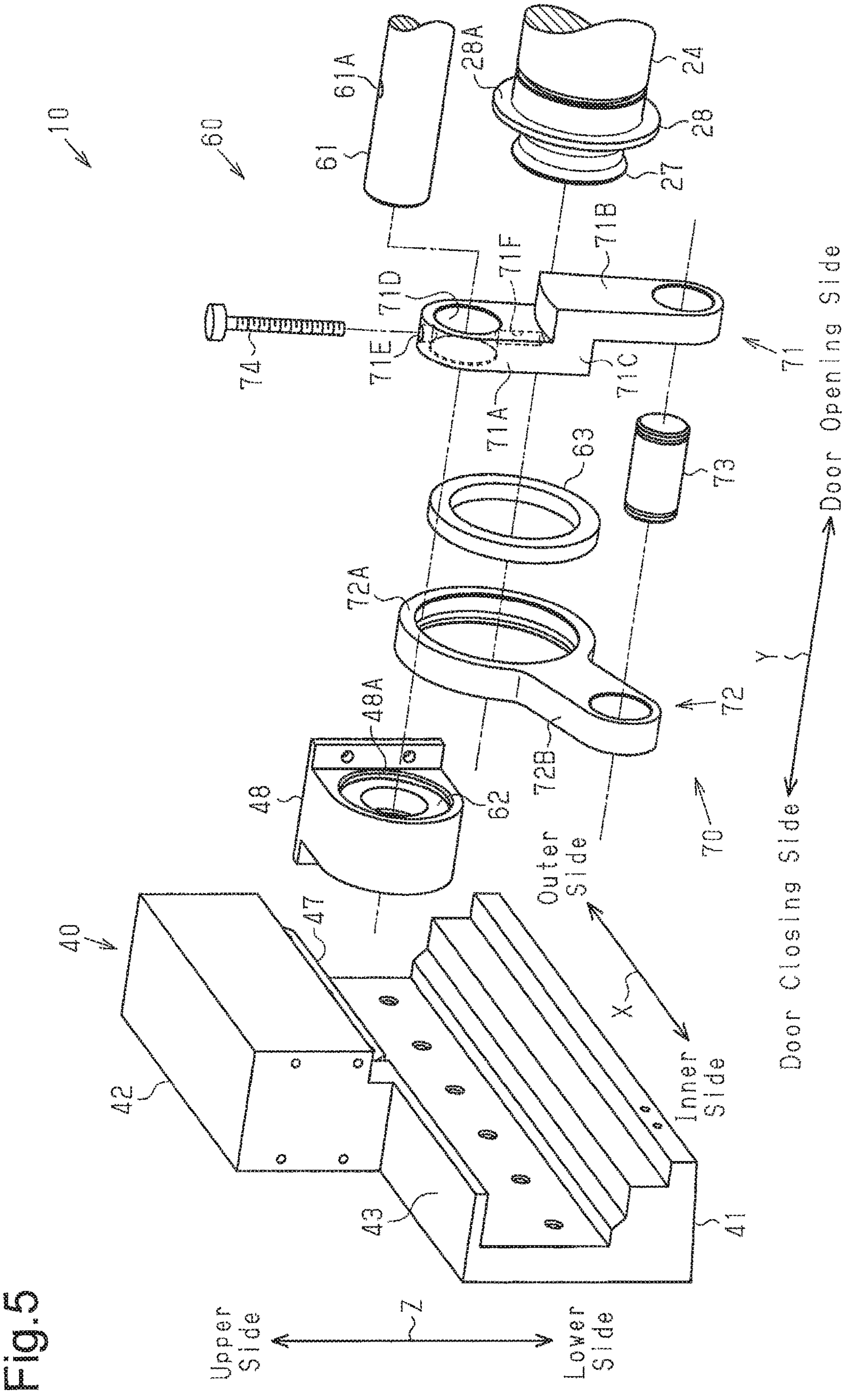
FIG. 5 is an exploded perspective view showing a portion of FIG. 2.

As shown in FIG. 5, the inner ring of the ball bearing 62 is coupled to the end of the interlock shaft 61 in the front-rear direction Y. The interlock shaft 61, which extends in the front-rear direction Y, is rotationally supported by the ball bearing 62 in the holding member 48.

A through hole 61A extends through the interlock shaft 61 in a direction orthogonal to the center axis of the interlock shaft 61.

The link mechanism 70 includes a crank-shaped first link 71, which is coupled to the interlock shaft 61 and rotatable integrally with the interlock shaft 61, and a plate-like second link 72, which is coupled to the movable guide 24 and rotatable relative to the movable guide 24. The first link 71 and the second link 72 form a revolute pair.

The first link 71 includes a first arm 71A coupled to the interlock shaft 61, a second arm 71B coupled to the second link 72, and a connection portion 71C connecting the first arm 71A and the second arm 71B. A pin 73 is fixed to the second arm 71B.

The first arm 71A is located toward a longitudinally outer side of the interlock shaft 61 from the second arm 71B. The distal end of the first arm 71A includes an insertion portion 71D, which is a through hole extending through the first arm 71A in the front-rear direction Y. The interlock shaft 61 is inserted into the insertion portion 71D. A through hole 71E extends through the first arm 71A from an outer surface of the circumference of the insertion portion 71D to the inner surface of the insertion portion 71D. A threaded hole 71F, which extends in the longitudinal direction of the first arm 71A, is formed in a portion of the first arm 71A opposed to the through hole 71E. When a screw 74 is inserted into the through hole 61A of the interlock shaft 61 and the through hole 71E of the first arm 71A and engaged with the threaded hole 71F, the first arm 71A is fixed to the interlock shaft 61. In the present embodiment, the through hole 61A of the interlock shaft 61, the through hole 71E of the first arm 71A, and the screw 74 form a phase setting unit, which sets the phase of the first link 71 when coupled to the interlock shaft 61. This structure reduces shear force applied to the screw 74. Thus, the interlock shaft 61 and the first arm 71A may be fixed in a further ensured manner.

Alternatively, the screw 74 may be engaged with a through hole that is formed instead of the through hole 61A and the threaded hole 71F. In this case, the coupling task may be reduced.

Further, a press-fitting pin may be used instead of a screw.

The second link 72 includes an annular guide link portion 72A coupled to the movable guide 24. An arm portion 72B, which extends to the guide link portion 72A, is coupled to the second arm 71B. The guide link portion 72A is coupled to the outer ring of a ball bearing 63, which is coupled to an end of the movable guide 24 in the front-rear direction Y. This allows the second link 72 to rotate relative to the movable guide 24. The arm portion 72B is coupled to the pin 73 and rotatable relative to the pin 73.

As shown in FIG. 6, the link mechanism 70 is located toward the vehicle outer side from the threaded shaft 21 and the electric motor 23. The first link 71 is inclined toward the vehicle inner side as extending downward. The second link 72 is inclined upward as extending toward the vehicle outer side. The pin 73 is located at a lower position than the center axis of the threaded shaft 21 and the center axis of the movable guide 24 and toward the vehicle inner side from the center axis of the interlock shaft 61.

Figure 7:
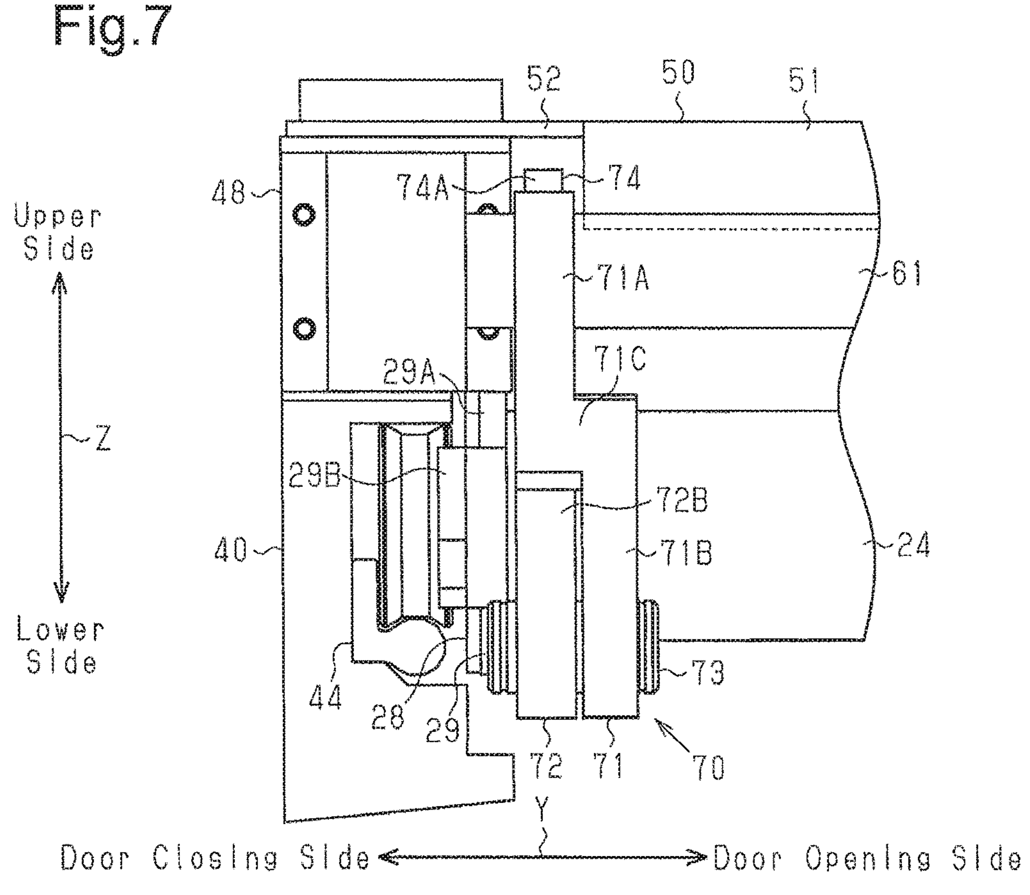
FIG. 7 is a front view showing the frame of FIG. 2 and its surrounding.

As shown in FIG. 7, the first link 71 is coupled to the end of the interlock shaft 61 in the front-rear direction Y. The rail plate 50 includes a slot 52 where the first link 71 is opposed in the width direction X so that interference is avoided between the first link 71 and the rail plate 50 and between the screw 74 and the rail plate 50.

The second link 72 and the first arm 71A of the first link 71 are located at the same side of the second arm 71B of the first link 71. The link arm 29 is located toward the rotary body 27 from the second link 72 in the front-rear direction Y. The guide link portion 29A is overlapped with the pin 73 in the width direction X. The plate 29B is located toward the rotary body 27 from the second arm 71B, the arm portion 72B of the second link 72, and the pin 73 in the front-rear direction Y and opposed to the second arm 71B, the arm portion 72B of the second link 72, and the pin 73.

The operation and effect of the plug door opening-closing apparatus 10 will now be described with reference to FIGS. 8 to 10. In the description below, a door closing-side link mechanism 70A refers to a link mechanism 70 located at the door closing side in the front-rear direction Y, and a door opening-side link mechanism 70B refers to a link mechanism 70 located at the door opening side in the front-rear direction Y. Additionally, to clearly show the operation of the plug door opening-closing apparatus 10, the plug door opening-closing apparatus 10 in FIGS. 8 to 10 may differ in dimensions and scale from that in FIG. 2.

Figure 8A:
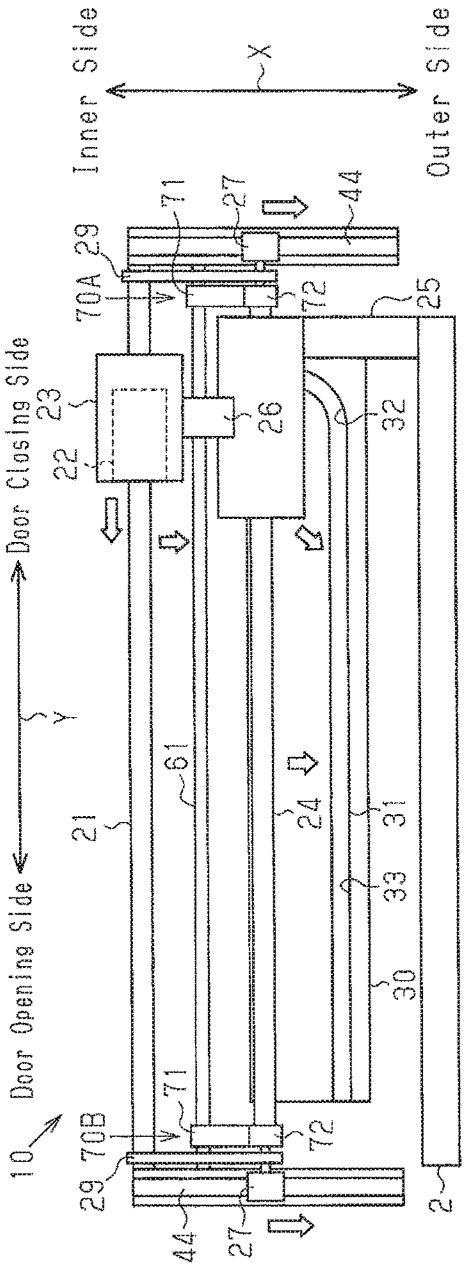
FIG. 8A is a schematic bottom view showing the plug door opening-closing apparatus when a door panel is fully closed.
Figure 8B:
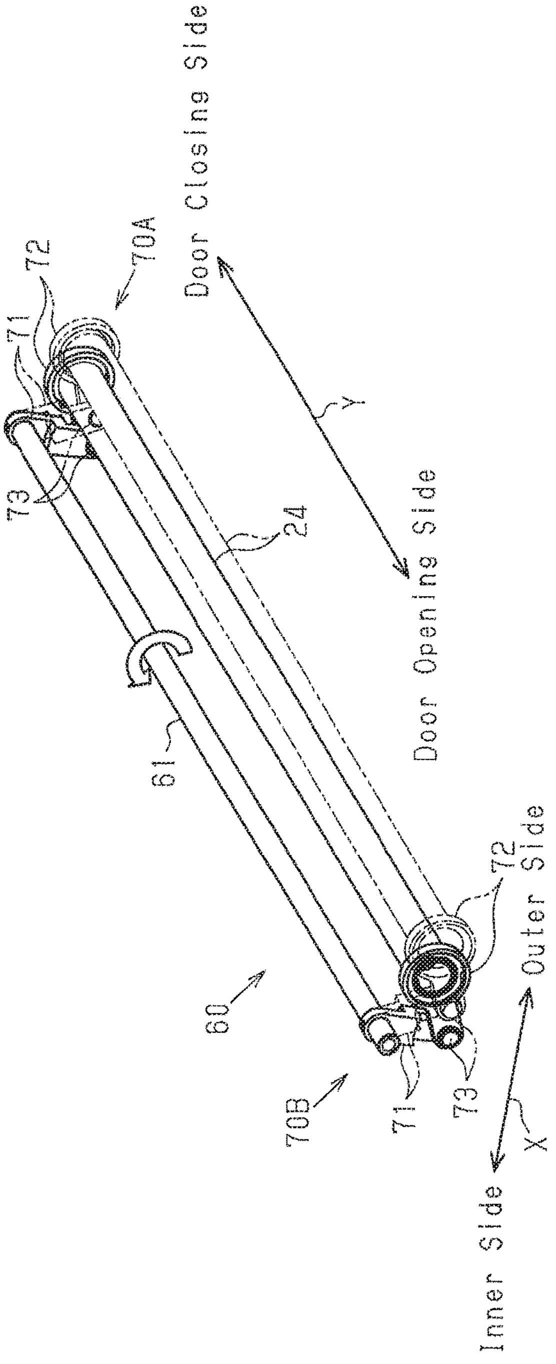
FIG. 8B is a perspective view showing a interlock mechanism when the door panel is fully closed.

FIG. 8A shows the plug door opening-closing apparatus 10 when the door panel 2 is fully closed. FIG. 8B shows the interlock mechanism 60 when the door panel 2 is fully closed. As shown in FIG. 8A, the door hanger 25 is located on a door closing-side end of the movable guide 24. The roller (not shown) of the door hanger 25 is located on the inclined portion 32 of the inclined rail 31. The motor 23 is located on a door closing-side portion of the threaded shaft 21.

Figure 10:
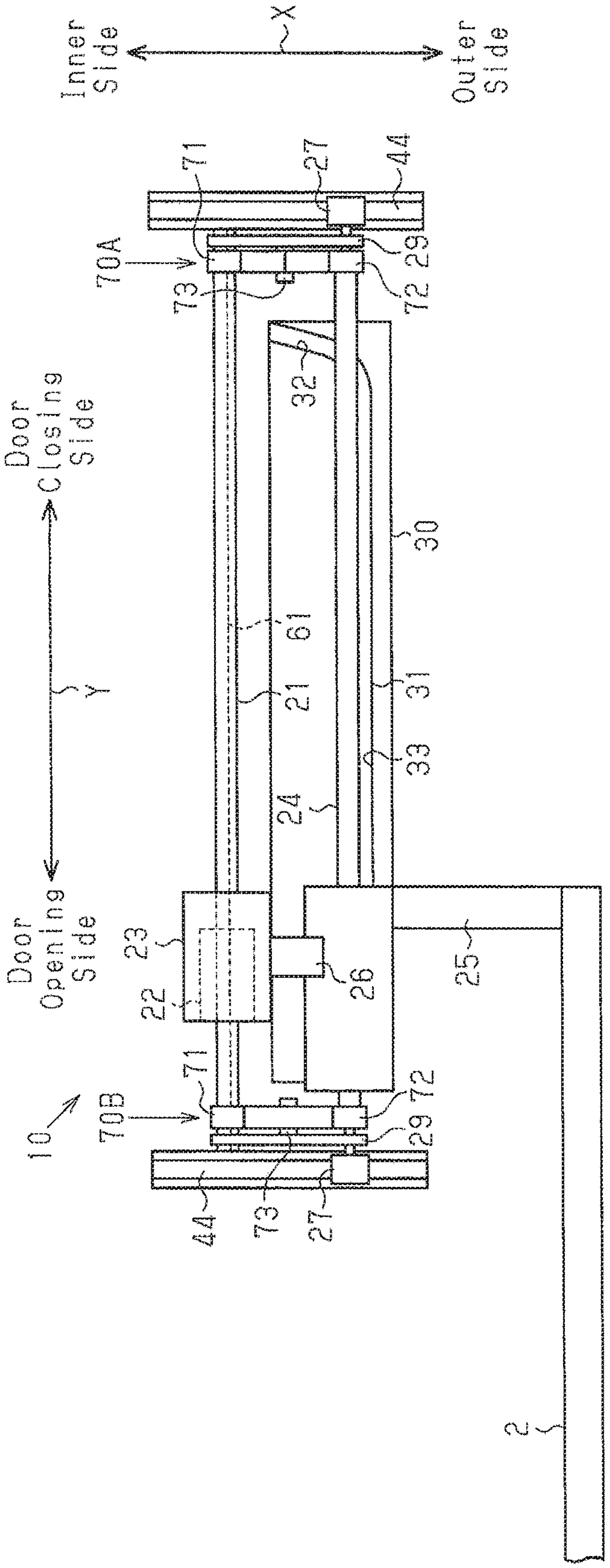
FIG. 10 is a schematic bottom view of the plug door opening-closing apparatus when the door panel is fully open.

When moving the door panel 2 from a fully closed position, which is shown in FIG. 8A, to a fully open position, which is shown in FIG. 10, the plug door device 1 drives the motor 23 to move the door panel 2 in the width direction X and then in the front-rear direction Y. When the door panel 2 is moved from the fully open position to the fully closed position, the plug door device 1 drives the motor 23 to move the door panel 2 in the front-rear direction Y and then in the width direction X.

When opening the door panel 2 from the fully closed state, the plug door device 1 drives the motor 23 to rotate the nut 22 forward. This moves the nut 22 and the motor 23 toward the door opening side relative to the threaded shaft 21. Since the motor 23 is coupled to the door hanger 25 by the coupling plate 26, the movement of the motor 23 provides the door hanger 25 with force that moves the door hanger 25 toward the door opening side. Due to the force applied to the door hanger 25, the roller of the door hanger 25 moves toward the vehicle outer side along the inclined portion 32 of the inclined rail 31 while moving toward the door opening side. Consequently, the door panel 2 moves toward the vehicle outer side while moving toward the door opening side. Such movement of the door hanger 25 moves the movable guide 24 toward the vehicle outer side. At this time, the rotary bodies 27, which are coupled to the two opposite ends of the movable guide 24, roll on the corresponding rails 44.

In accordance with the movement of the movable guide 24 toward the vehicle outer side, the link mechanisms 70, which are located at the two opposite ends of the movable guide 24, operate as follows. That is, as shown in FIG. 8B, in accordance with the movement of the movable guide 24 toward the vehicle outer side, when the second link 72 of the door closing-side link mechanism 70A moves toward the vehicle outer side, the pin 73 moves toward the vehicle outer side. This pulls a joint portion of the first link 71 and the second link 72 toward the vehicle outer door and rotates the first link 71 together with the interlock shaft 61 in a direction indicated by the white arrow. When the interlock shaft 61 rotates, the first link 71 of the door opening-side link mechanism 70B rotates in the same direction as the first link 71 of the door closing-side link mechanism 70A. This moves the pin 73 of the door opening-side link mechanism 70B toward the vehicle outer side. Accordingly, the second link 72 of the door opening-side link mechanisms 70B moves toward the vehicle outer side. Consequently, the second link 72 of the door opening-side link mechanism 70B pushes the movable guide 24 toward the vehicle outer side, and a door opening-side end of the movable guide 24 moves toward the vehicle outer side. In this manner, the movement amount of the door closing-side end of the movable guide 24 conforms to the movement amount of the door opening-side end of the movable guide 24 due to the interlock shaft 61, the door closing-side link mechanism 70A, and the door opening-side link mechanism 70B. This hinders the movable guide 24 from inclining relative to the front-rear direction Y and results in no jamming. The term "conform" includes complete conformance and also a slight difference to an extent that does not hinder movement of the movable guide 24 in the width direction X. This is because the movable guide 24 only needs to move in the width direction X without jamming.

In this example, the operation starting from the door closing-side link mechanism 70A is illustrated. However, the operation is the same when starting from the door opening-side link mechanism 70B.

As shown in FIG. 8A, when the movable guide 24 moves toward the vehicle outer side, the threaded shaft 21, which is linked to the movable guide 24 by the link arm 29, moves together with the movable guide 24 toward the vehicle outer side. The motor 23 moves together with the threaded shaft 21 toward the vehicle outer side.

Figure 9A:
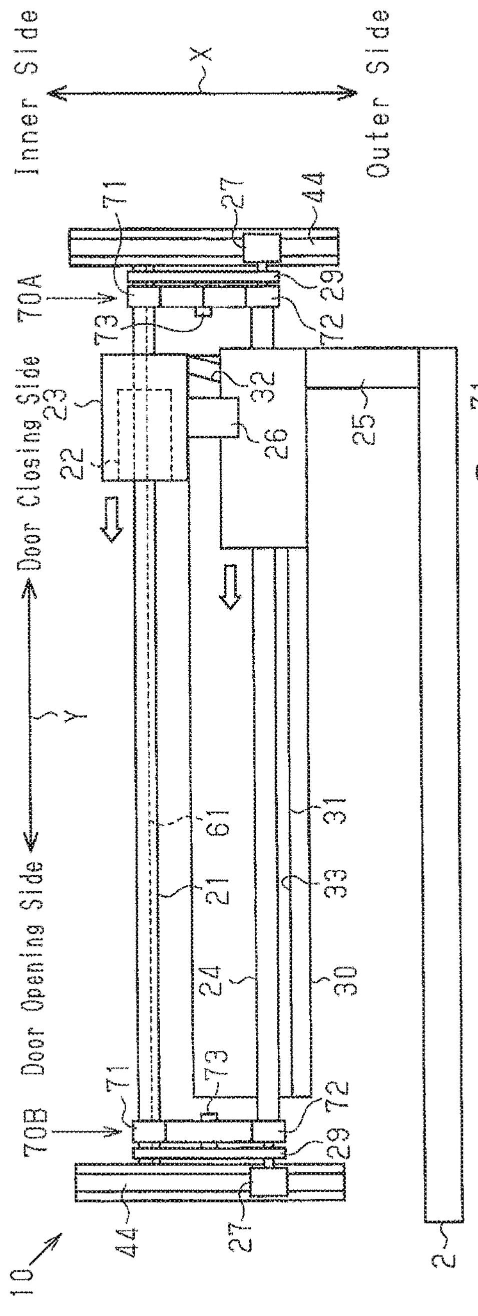
FIG. 9A is a schematic bottom view showing the plug door opening-closing apparatus when the door panel is moved to an outer side of a vehicle side wall.
Figure 9B:
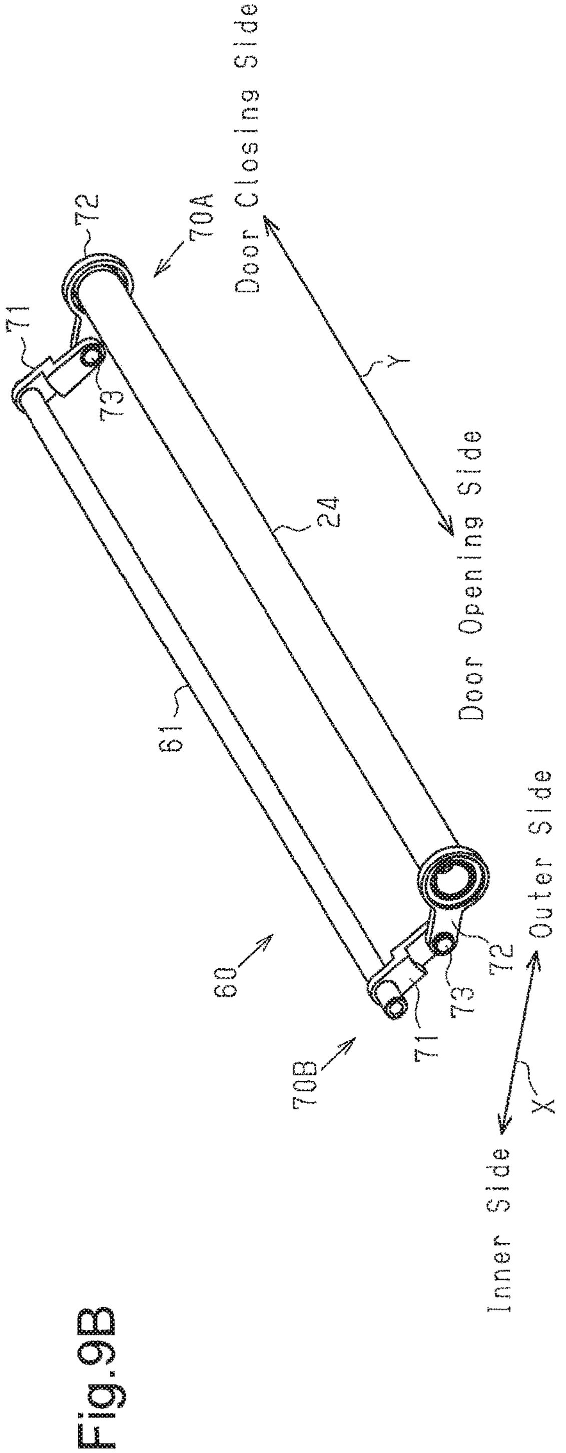
FIG. 9B is a perspective view showing the interlock mechanism when the door panel is moved to the outer side of the vehicle side wall.

As shown in FIG. 9A, when the electric motor 23 further moves toward the door opening side and the roller of the door hanger 25 passes the inclined portion 32 of the inclined rail 31, the movement of the movable guide 24 and the door hanger 25 toward the vehicle outer side is restricted. This restricts outward movement of the door panel 2 in the width direction X. At this time, as shown in FIG. 9B, a bent angle is increased in each of the door closing-side link mechanism 70A and the door opening-side link mechanism 70B. Here, the bent angle refers to an angle between a first link 71 and a corresponding second link 72, more specifically, an angle formed between a straight line connecting the center axis of the interlock shaft 61 and the center axis of the pin 73 and a straight line connecting the center axis of the pin 73 and the center axis of the movable guide 24 as the link mechanisms 70 are viewed in the front-rear direction Y.

Then, when the motor 23 further moves toward the door-opening side in the front-rear direction Y, the roller of the door hanger 25 moves along the straight portion 33 of the inclined rail 31. This moves the door panel 2 toward the door opening-side in the front-rear direction Y.

Then, as shown in FIG. 10, the motor 23 stops after moving to a door opening-side end of the threaded shaft 21. In accordance with the movement of the motor 23, the door hanger 25 moves to the door opening-side end of the movable guide 24. At this time, the door panel 2 is in the fully open position. When the door panel 2 only moves in the front-rear direction Y, the door closing-side link mechanism 70A and the door opening-side link mechanism 70B remain in the same state as that shown in FIG. 9B.

When closing the door panel 2 from the fully open position shown in FIG. 10, the plug door device 1 drives the motor 23 to reversely rotate the nut 22. This moves the motor 23, the door hanger 25, and the door panel 2 toward the door closing side in the front-rear direction Y. When the roller of the door hanger 25 travels in the inclined portion 32 of the inclined rail 31, the motor 23, the door hanger 25, and the door panel 2 move toward the door closing side in the front-rear direction Y and the vehicle inner side. Consequently, the door panel 2 is fully closed.

The plug door device 1 of the present embodiment has the advantages described below.

(1) The plug door opening-closing apparatus 10 includes the interlock mechanism 60 that conforms the movement amount of the two opposite ends of the movable guide 24, which moves in the width direction X. This prevents the movable guide 24, which is supported by the rails 44, from jamming when moving in the width direction X. Thus, the movable guide 24 smoothly moves in the width direction X, and the movement of the door panel 2 is stabilized in the width direction X.

(2) The interlock mechanism 60 includes the interlock shaft 61 extending in the front-rear direction Y and the link mechanisms 70 coupling the interlock shaft 61 and the movable guide 24 at the two opposite ends. Even when no electric power is supplied, the movement amounts of the two opposite ends of the movable guide 24 are conformed to each other by the link mechanisms 70. More specifically, even when the vehicle 200 is not supplied with electric power, the interlock mechanism 60 functions and the door panel 2 may be smoothly opened and closed.

(3) For example, when an interlock mechanism is configured to transmit force using a rack and pinion mechanism, pitches of racks would need to be aligned with one another. This requires high coupling precision and is burdensome. However, the plug door opening-closing apparatus 10 of the embodiment includes the interlock mechanism 60 including the two link mechanisms 70. The link mechanisms 70 transmit force between the first portion and the second portion of the movable guide 24. Each link mechanism 70 couples the interlock shaft 61 and the movable guide 24 by the first link 71 and the second link 72, which is rotationally coupled to the first link 71. This allows for easy coupling compared to when a rack and pinion mechanism is used.

(4) The two link mechanisms 70 are coupled to the two opposite ends of the movable guide 24 in the front-rear direction Y. Thus, the door hanger 25 moves between the two opposite ends of the movable guide 24 in the front-rear direction Y. This allows for an increase in the length in which the door hanger 25 moves on the movable guide 24 compared to when the two link mechanisms 70 are coupled to intermediate portions of the movable guide 24 in the front-rear direction Y. More specifically, the open width of the door panel 2 may be increased without increasing the size of the plug door opening-closing apparatus 10 in the front-rear direction Y.

(5) Each second link 72 is rotationally coupled to the movable guide 24. Thus, when coupling the second link 72 and the corresponding first link 71, the second link 72 may be rotated relative to the movable guide 24. This improves efficiency of the task for coupling each link mechanism 70 compared to when the second link 72 is rotated together with the movable guide when coupling to the first link 71.

(6) The interlock shaft 61 is located toward the vehicle inner side from the movable guide 24. Thus, the joint portions of the first links 71 and the corresponding second links 72 are located toward vehicle inner side of the movable guide 24. This facilitates the coupling of each link mechanism 70 when one couples the link mechanism 70 from the vehicle inner side.

(7) The interlock mechanism 60 includes the phase setting unit that sets at least the phase of each first link 71 when coupled to the interlock shaft 61. The coupling phases of the first links 71 of the link mechanisms 70 may conform to each other due to the phase setting unit.

(8) The phase setting unit of the interlock mechanism 60 includes the through holes 61A of the interlock shaft 61, the through holes 71E of the first links 71, and the screws 74, which are inserted through the through holes 61A, 71E to fasten the interlock shaft 61 and the first links 71. Thus, each screw 74 sets the phase of the corresponding first link 71 relative to the interlock shaft 61 and positions the first link 71 relative to the interlock shaft 61 in the front-rear direction Y. Therefore, the operation for engaging the screw 74 simultaneously performs the setting of the phase, the positioning in the front-rear direction Y, and the fixing. This reduces the coupling task.

(9) In the front-rear direction Y, each second link 72 and the first arm 71A of the corresponding first link 71 are located at the same side of the second arm 71B. This allows for an increase in the length in which the door hanger 25 moves on the movable guide 24 compared to when the second link 72 and the second arm 71B are located at opposite sides of the first arm 71A. That is, the open width of the door panel 2 may be increased without increasing the size of the plug door opening-closing apparatus 10 in the front-rear direction Y of the vehicle 200.

(10) The rail plate 50 includes the flange 51 extending in the front-rear direction Y. The flange 51 increases the rigidity of the rail plate 50. This hinders deformation of the inclined rail 31 of the rail block 30, which is supported by the rail plate 50, and stabilizes movement of the door panel 2. Additionally, the first arms 71A of the first links 71 are located at the longitudinally outer sides of the interlock shaft 61. This prevents the flange 51 from contacting the first arms 71A, more particularly, screw heads 74A of the screws 74, even when the size of the flange 51 is set to be increased in the front-rear direction Y. Thus, the rigidity of the rail plate 50 is further increased.

(11) The rotary bodies 27 are coupled to the two opposite ends of the movable guide 24 and rotatable relative to the movable guide 24. This decreases the friction between the movable guide 24 and the rails 44. Thus, the movable guide 24 moves in the width direction X in a further smooth manner.

(12) When separation of the rotary bodies 27 from the corresponding rails 44 results in the two link mechanisms 70 having different bent angles, the movable guide 24 may be inclined relative to the front-rear direction Y and jamming may be occurred. Thus, it is preferred that the plug door opening-closing apparatus 10 includes the stoppers 47, which cooperate with the corresponding rails 44 to hold the corresponding rotary bodies 27 in the radial direction of the rotary bodies 27. The stoppers 47 hinder the separation of the rotary bodies 27 from the rails 44 and maintains the bent angles of the two link mechanisms 70 substantially the same. Thus, movement of the movable guide 24 is stabilized in the width direction X.

(13) The plug door opening-closing apparatus 10 includes the link arms 29, which link the threaded shaft 21 and the movable guide 24. The movable guide 24 is rotatable relative to the link arms 29. Thus, the movable guide 24 and the threaded shaft 21 integrally move in the width direction X. This provides the threaded shaft 21 with the effect of the movable guide 24 obtained due to the interlock mechanism 60. Consequently, the threaded shaft 21 smoothly moves in the width direction X, and the movement of the door panel 2 in the width direction X is further stabilized. Additionally, when the movable guide 24 rotates while moving in the width direction X, interference of the rotation of the movable guide 24 by the link arms 29 is restricted. Thus, the movable guide 24 may smoothly move in the width direction X.

(14) The lower end of the attachment portion 45 of each rail 44 is in contact with the base 41 of the corresponding frame 40 in the front-rear direction Y. Thus, the rail 44 may be easily positioned relative to the frame 40 in the front-rear direction Y. Additionally, the force applied from the rotary body 27 to the support portion 46 of the rail 44 is supported by the base 41, which is in contact with the lower end of the attachment portion 45. This limits deformation of the support portion 46 that would occur due to the force applied from the rotary body 27 to the support portion 46 of the rail 44.

Additionally, the attachment portion 45 of the rail 44 is in contact with the base 41 of the frame 40 in the front-rear direction Y. Thus, the rail 44 may be easily positioned relative to the frame 40 in the front-rear direction Y.

(15) The attachment portion 45 of the rail 44 is opposed to the rotary body 27 in the front-rear direction Y having a slight gap located in between. This restricts inclination of the rotary body 27 relative to the height direction Z and movement of the rotary body 27 toward the end of the plug door opening-closing apparatus 10 in the front-rear direction Y.

(16) The cover 43 of each frame 40 covers an upper side of the corresponding link arm 29. Thus, the cover 43 restricts upward movement of the link arm 29. This hinders the two opposite ends of the threaded shaft 21 in the front-rear direction Y from moving upward relative to the movable guide 24.

(17) In the crank-shaped plate 29B of each link arm 29, the vehicle outer end is located toward the end of the movable guide 24 in the front-rear direction Y from the vehicle inner end. Thus, the pin 73 of each link mechanism 70, which is opposed to the vehicle outer end of the corresponding plate 29B in the front-rear direction Y, tends to be located toward the end of the movable guide 24 in the front-rear direction Y. This allows for an increase in the length in which the door hanger 25 moves on the movable guide 24.

(18) The interlock shaft 61 is located at an upper position than the movable guide 24 and toward the inner side from the movable guide 24. This limits enlargement of the plug door opening-closing apparatus 10 in the height direction Z and allows for a compact structure compared to when the interlock shaft 61 is located at a lower position than the movable guide 24 and when the interlock shaft 61 is located at the same position as the movable guide 24 in the width direction X. Additionally, compared to when the interlock shaft 61 is located at the same position as the movable guide 24 in the height direction Z, the gap may be decreased between the movable guide 24 and the motor 23 in the width direction X. This limits enlargement of the plug door opening-closing apparatus 10 in the width direction X and allows for a compact structure.

It should be apparent to those skilled in the art that the present invention may be embodied in many other specific forms without departing from the scope of the invention.

Particularly, it should be understood that the present invention may be embodied in the following forms.

Modified Example 1

Figure 11:
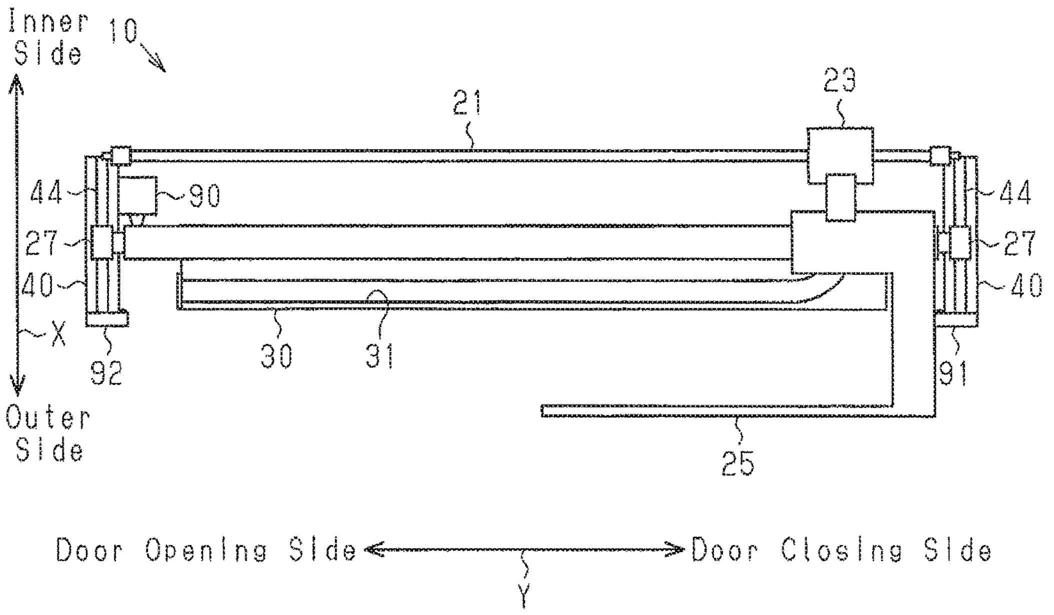
FIG. 11 is a schematic bottom view showing a modified example of a plug door opening-closing apparatus.

The interlock mechanism 60 may have any configuration. FIG. 11 shows one example of an interlock mechanism 60 having a different configuration. The interlock mechanism 60 includes an actuator 90, which applies force acting in the width direction X to the movable guide 24, a first position sensor 91 and a second position sensor 92, which detect the position of the movable guide 24, and a controller (not shown), which controls the actuator 90.

The actuator 90 includes a linear cylinder and may use an air pressure cylinder, an electric cylinder, or a hydraulic cylinder. The actuator 90 is coupled to the door opening-side end of the movable guide 24 so that force may be applied in two directions (vehicle inner side and vehicle outer side). The first position sensor 91 detects the position of the door closing-side end of the movable guide 24 in the width direction X. The second position sensor 92 detects the position of the door opening-side end of the movable guide 24 in the width direction X. One example of each of the position sensors 91, 92 is an optical sensor.

The controller performs feedback control on the actuator 90 in accordance with a detection result of each of the position sensors 91, 92. In the feedback control, when displacement of the door closing-side end and the door opening-side end of the movable guide 24 is detected, position control is performed on the actuator 90 to reduce the displacement. When the actuator 90 applies force to the door opening-side end of the movable guide 24, the door opening-side end is moved further due to the force applied from the actuator 90 in the width direction X. This reduces the displaced amount of the door opening-side end and the door closing-side end of the movable guide 24.

Modified Example 2

In a further different configuration of the interlock mechanism 60, the actuator 90 shown in FIG. 11 is located at each of two opposite ends of the movable guide 24. The controller performs feedback control on the two actuators 90 in accordance with a detection result of each of the position sensors 91, 92. In this case, the actuators 90 do not have to be coupled as long as each actuator 90 applies force in one direction (vehicle outer side).

Modified Example 3

Figure 12:
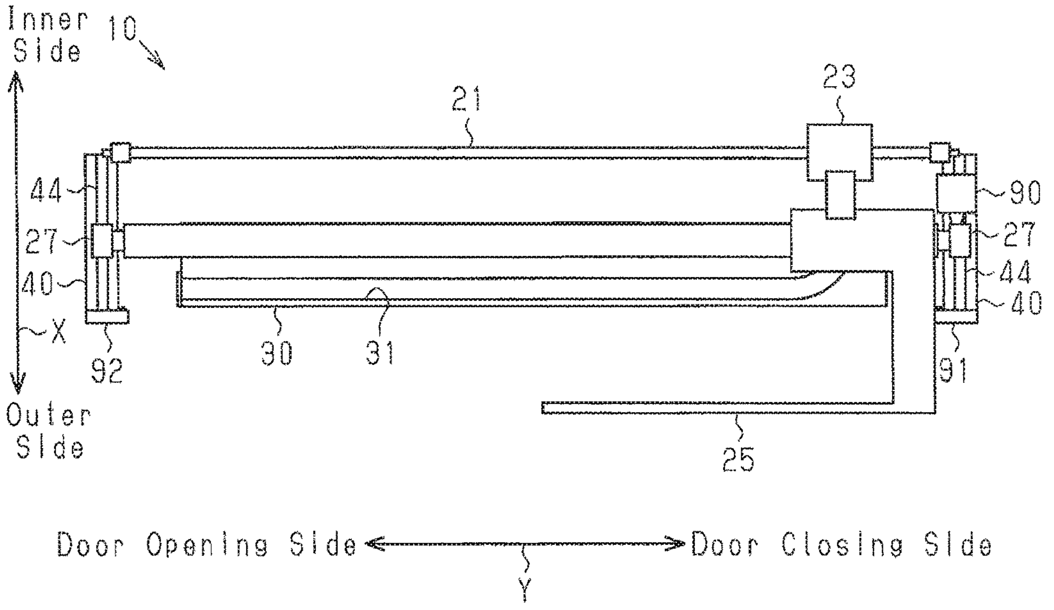
FIG. 12 is a schematic bottom view showing another modified example of a plug door opening-closing apparatus.

FIG. 12 shows a further different example of an interlock mechanism 60. The actuator 90 of the interlock mechanism 60 is coupled so that force in the two directions (vehicle outer side and vehicle inner side) is applied to the rotary body 27 that is located at the door closing side of the movable guide 24. The remaining configuration is substantially the same as that of the interlock mechanism 60 shown in FIG. 11.

When the movable guide 24 moves toward the vehicle outer side in accordance with movement of the door panel 2 from the fully open position to the fully closed position, the movement amount of the movable guide 24 may be larger at the door closing side than at the door opening side. In this regard, when the movable guide 24 moves toward the vehicle outer side, the actuator 90 of FIG. 12 provides the door closing-side end of the movable guide 24 with force that pushes the movable guide 24 toward the vehicle outer side or pulls the movable guide 24 toward the vehicle inner side. This reduces the displaced amount of the door opening-side end and the door closing-side end of the movable guide 24.

Modified Example 4

Instead of performing feedback control on the actuator 90, the controller of the interlock mechanism 60 shown in FIGS. 11 and 12 may control the actuator 90 so that the actuator 90 provides the movable guide 24 with force predetermined in advance through experiments or the like.

Modified Example 5

Instead of the interlock mechanism 60 of FIG. 12, a further different example of an interlock mechanism 60 includes elastic members. The elastic members couple the door closing-side end and the door opening-side end of the movable guide 24 to the vehicle outer ends of the corresponding frames 40. One example of the elastic member is a coil spring. The coil springs are compressed when the movable guide 24 moves toward the vehicle outer side. In this structure, when the movable guide 24 moves toward the vehicle outer side, the coil springs apply force that pushes the movable guide 24 toward the vehicle outer side to the door closing-side end and the door opening-side end of the movable guide 24. In this case, when the two ends are displaced, the force applied to one end is larger than that applied to the other end. The difference in force reduces the displaced amount of the positions of the door opening-side end and the door closing-side end of the movable guide 24.

Modified Example 6

Instead of the interlock mechanism 60 of FIG. 12, a further different example of an interlock mechanism 60 provides each rotary body 27 with a brake mechanism. When the movable guide 24 moves toward the vehicle outer side, if the two opposite ends of the movable guide 24 are displaced, control is executed so that braking force applied to the rotary body 27 located at one end becomes larger than that applied to the rotary body 27 located at the other end. This reduces the displaced amount of the door opening-side end and the door closing-side end of the movable guide 24. An electromagnetic brake may be used as the brake mechanism.

Modified Example 7

Figure 13:
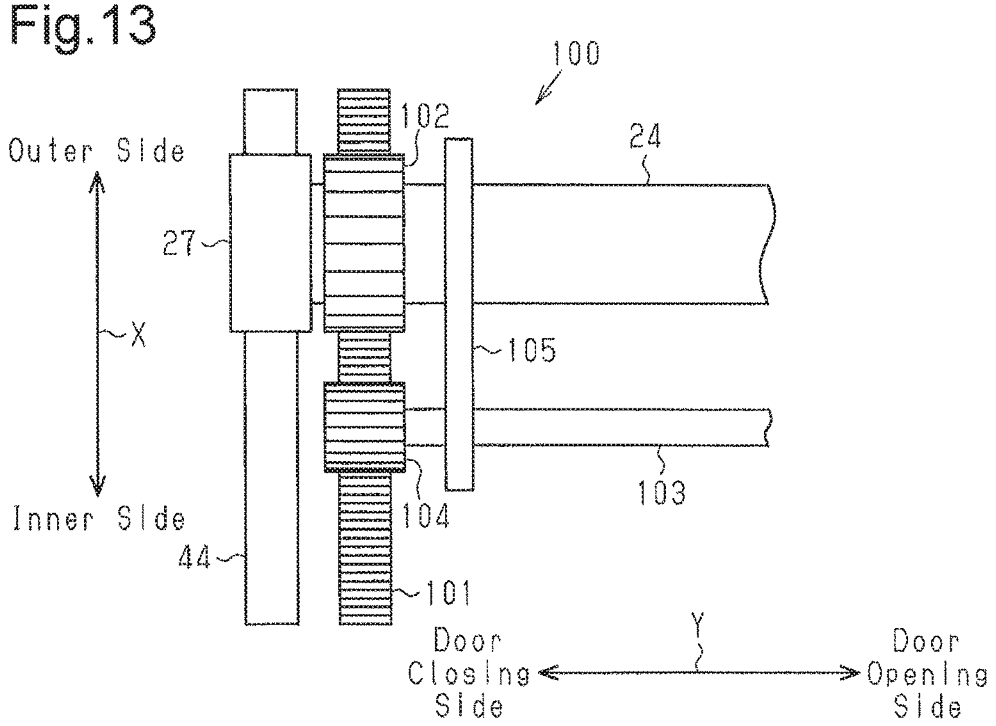
FIG. 13 is a partial plan view showing a modified example of an interlock mechanism.

FIG. 13 shows an interlock mechanism 100, which is a further different example of an interlock mechanism 60. The interlock mechanism 100 includes rack gears 101 located along the corresponding rails 44, first pinion gears 102 fixed to the movable guide 24, a coupling shaft 103 located parallel to the movable guide 24, second pinion gears 104 fixed to the coupling shaft 103, and a link plate 105 that couples the movable guide 24 and the coupling shaft 103. The movable guide 24 and the coupling shaft 103 are rotatable relative to the link plate 105. Each of the pinion gears 102, 104 is engaged with the corresponding rack gear 101.

The door driving mechanism 20 further includes pinion gears, which are coupled to the two opposite ends of the movable guide 24, and rack gears extending in the width direction X. The pinion gears are engaged with the rack gears.

Modified Example 8

Figure 14A:
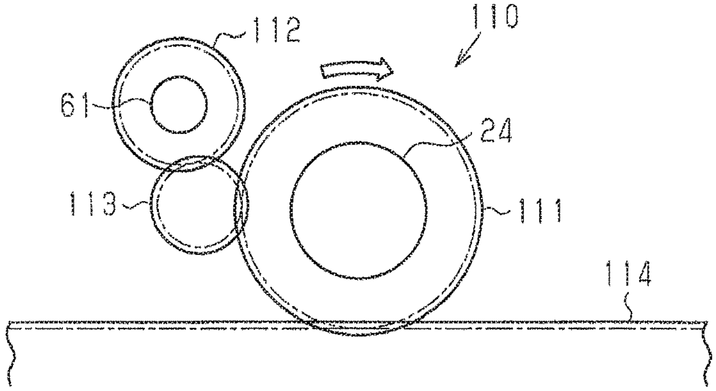
FIG. 14A is a partial schematic side view showing another modified example of an interlock mechanism when the door panel is fully closed.

The interlock mechanism 60 includes gear trains 110 and rack gears 114, such as that shown in FIG. 14A, instead of the link mechanisms 70. Each gear train 110 includes a first gear 111, a second gear 112, and a third gear engaged with the gears 111, 112. The first gears 111 are respectively fixed to the two opposite ends of the movable guide 24. The second gears 112 are respectively fixed to the two opposite ends of the interlock shaft 61. Each first gear 111 is engaged with the corresponding rack gear 114.

Figure 14B:
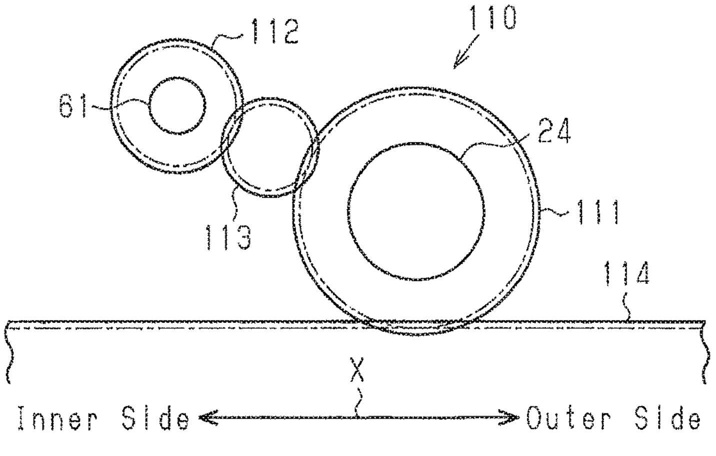
FIG. 14B is a partial schematic side view showing the modified example of the interlock mechanism when the door panel is moved to the outer side of the vehicle side wall.

In the interlock mechanism 60, when the movable guide 24 moves in the width direction X, the first gear 111 rotates in a direction indicated by the white arrow and, as shown in FIG. 14B, the third gear 113 orbits around the first gear 111.

Modified Example 9

Portions other than the two opposite ends of the movable guide 24 in the front-rear direction Y may serve as the first portion and the second portion of the movable guide 24, and the interlock mechanism 60 may conform the movement amounts of the portions to each other. The interlock mechanism 60 only needs to conform the movement amounts of at least two portions of the movable guide 24 that are located at different positions in the front-rear direction Y.

Modified Example 10

The interlock mechanism 60 may include three or more link mechanisms 70. When including three or more link mechanisms 70, the interlock mechanism 60 conforms the amounts in which three or more portions of the movable guide 24 that are located at different positions in the front-rear direction Y move in the same width direction X.

Modified Example 11

The second link 72 of each link mechanism 70 may be arranged so that the second link 72 cannot rotate relative to the movable guide 24. This eliminates the need for machining the inner circumference of the guide link portion 72A and reduces the task for machining compared to when the second link 72 is arranged to be rotatable relative to the movable guide 24. In this case, the rotary body 27 is arranged to be rotatable relative to the movable guide 24.

Modified Example 12

A link mechanism 70 may be added to a middle portion of the movable guide 24 in the front-rear direction Y. This increases the resistance against the torsion of the interlock shaft 61.

Modified Example 13

Figure 15:
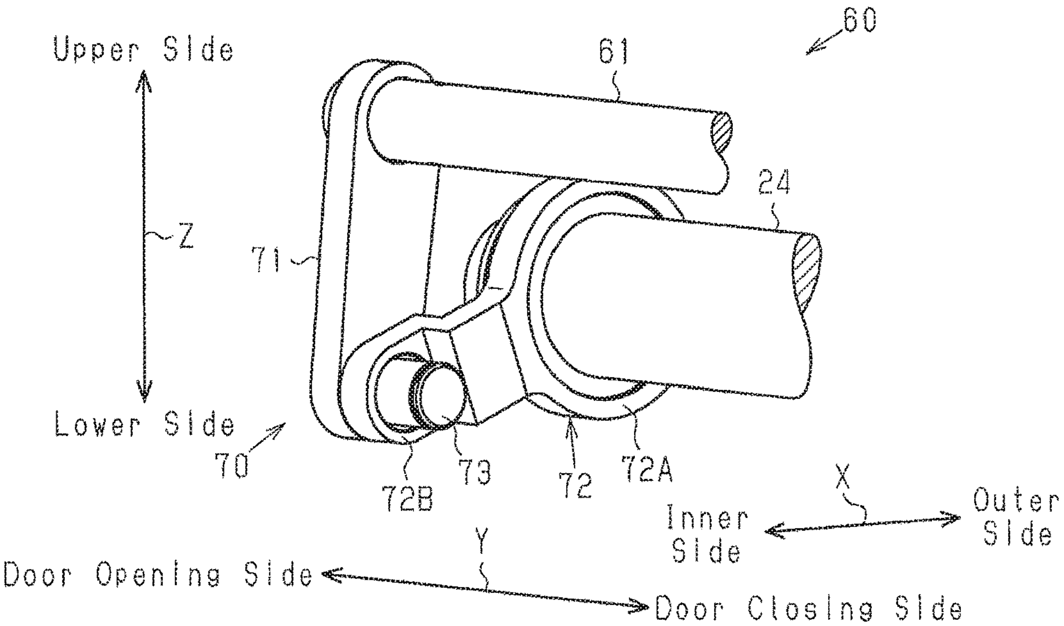
FIG. 15 is a perspective view showing a portion of another modified example of an interlock mechanism.

As shown in FIG. 15, each link mechanism 70 may include a plate-like first link 71 and a crank-like second link 72.

Modified Example 14

Each first link 71 and each second link 72 may have any length. When the door panel 2 is fully closed, the position of the joint portion of each first link 71 and the corresponding second link 72 in the width direction X is geometrically determined based on the length and position of each link. In one example, the joint portion is located at a position toward the vehicle outer side from at least one of the interlock shaft 61 and the movable guide 24. When the first link 71 is located downward in the vertical direction when the door panel 2 is fully closed, the size of the plug door opening-closing apparatus 10 may be reduced in the width direction X.

Modified Example 15

The interlock mechanism 60 may include a positioning member, which positions each second link 72 in the front-rear direction Y relative to the movable guide 24. One example of the positioning member is a snap ring.

Modified Example 16

The structure of each phase setting unit, which sets the phase, that is, the circumferential position of the first link 71 relative to the interlock shaft 61, may be modified as follows.

Figure 16:
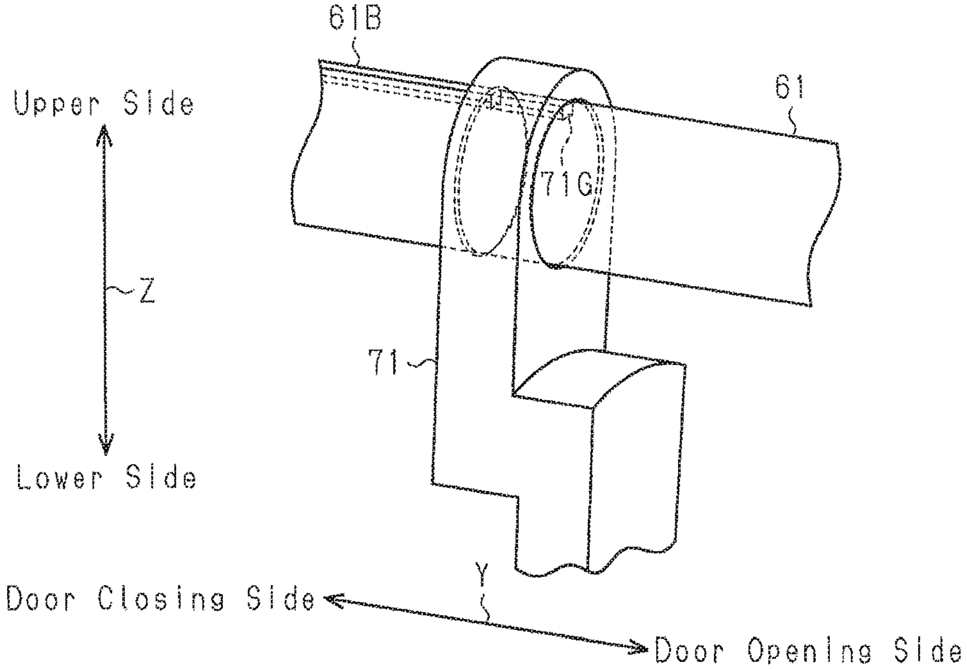
FIG. 16 is a perspective view showing a modified example of an interlock shaft and a first link.

In a modified example shown in FIG. 16, the phase setting unit includes a recess 61B formed in an end portion of the interlock shaft 61 and a projection 71G formed on the first link 71. In this structure, when the projection 71G is fitted to the recess 61B, the phase of the first link 71 is set relative to the interlock shaft 61 in the circumferential direction. Additionally, when the projection 71G contacts the end of the recess 61B, the phase of the first link 71 is set relative to the interlock shaft 61 in the axial direction. Alternatively, a projection may be formed on the interlock shaft 61 when a recess is formed in the first link 71.

Modified Example 17

Any means may be used to fix each first link 71 to the interlock shaft 61 and includes, for example, weld, bond, press-fit, and a pin. When the first link 71 is fixed to the interlock shaft 61 by welding, bonding, or press-fitting, the phase setting units may be omitted from the interlock shaft 61.

Modified Example 18

The number of the through holes 61A of the interlock shaft 61, the through holes 71E of each first link 71, and the screws 74 may each be changed to any number.

Modified Example 19

The interlock shaft 61 may be located at any position. For example, the interlock shaft 61 may be located toward the vehicle outer side from the movable guide 24.

Modified Example 20

The rotary bodies 27 of the door driving mechanism 20 may be fixed to the movable guide 24 so that the rotary bodies 27 cannot rotate relative to the movable guide 24. In this case, the bearing between the movable guide 24 and each rotary body 27 is omitted. This simplifies the structure.

Modified Example 21

The structure of the door driving mechanism 20, which guides movement of the movable guide 24 in the width direction X, may be modified, for example, as follows.

Figure 17:
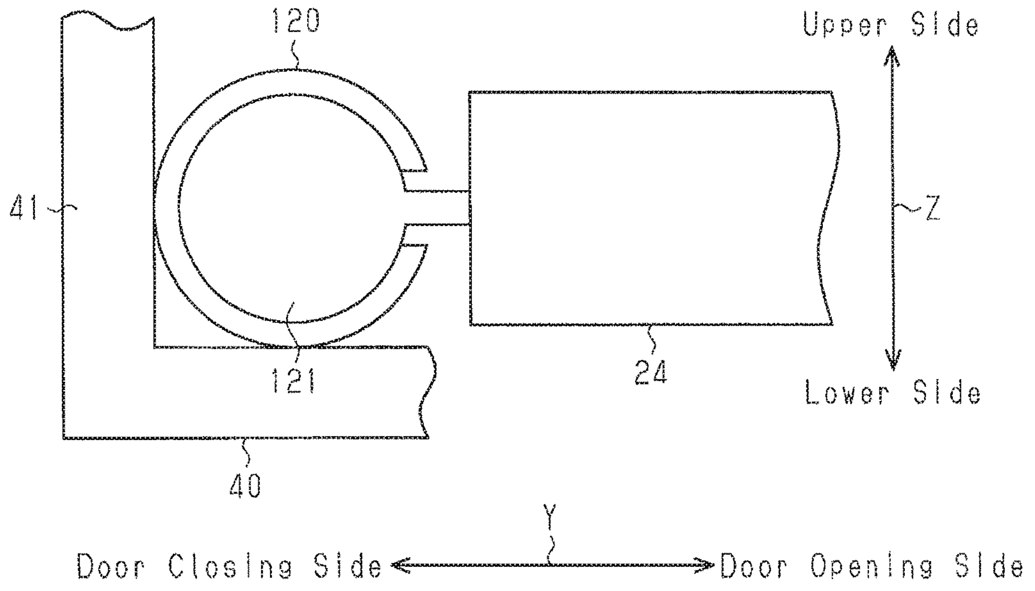
FIG. 17 is a front view showing a structure that supports a modified example of a movable guide when moving in the vehicle width direction.

The door driving mechanism 20 may include a pipe 120 fixed to each frame 40 and a slide shaft 121 fixed to an end of the movable guide 24 (refer to FIG. 17) instead of the rails 44 and the rotary bodies 27. The pipes 120 and the slide shafts 121 each extend in the width direction X. Each slide shaft 121 is inserted into the corresponding pipe 120 and movable relative to the pipe 120 in the width direction X. The pipes 120 each correspond to a guide support member.

Modified Example 22

Figure 18:
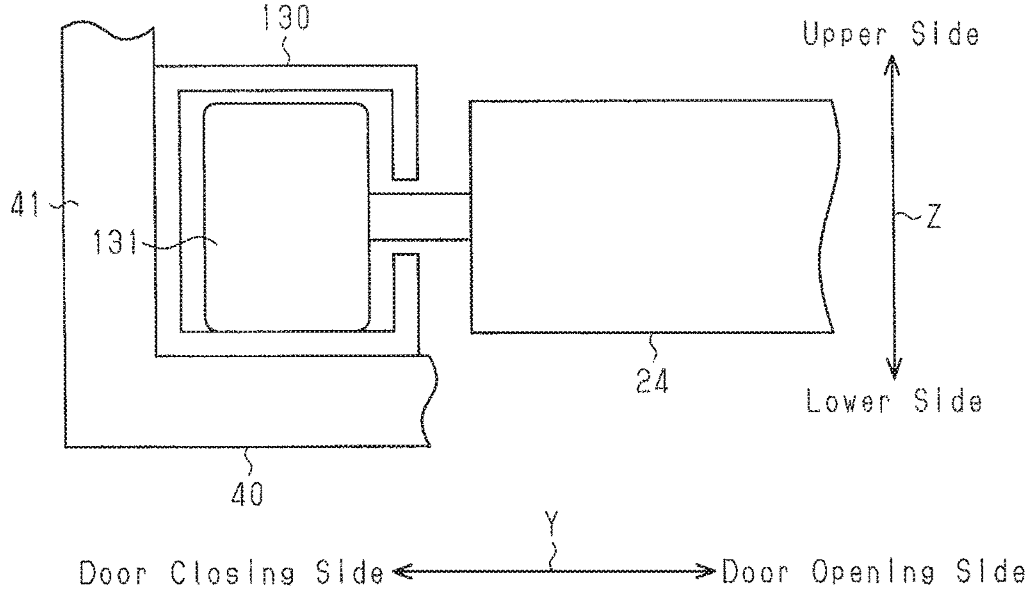
FIG. 18 is a front view showing a structure that supports a modified example of a movable guide when moving in the vehicle width direction.

The door driving mechanism 20 may include a guide rail 130 fixed to each frame 40 and a rotary body 131 coupled to an end of the movable guide (refer to FIG. 18) instead of the rails 44 and the rotary bodies 27. The guide rails 130 each extend in the width direction X. The rotary bodies 131 are located in the corresponding guide rails 130 and rotatable relative to the movable guide 24. In this case, the guide rails 130 each correspond to a guide support member.

Modified Example 23

Figure 19:
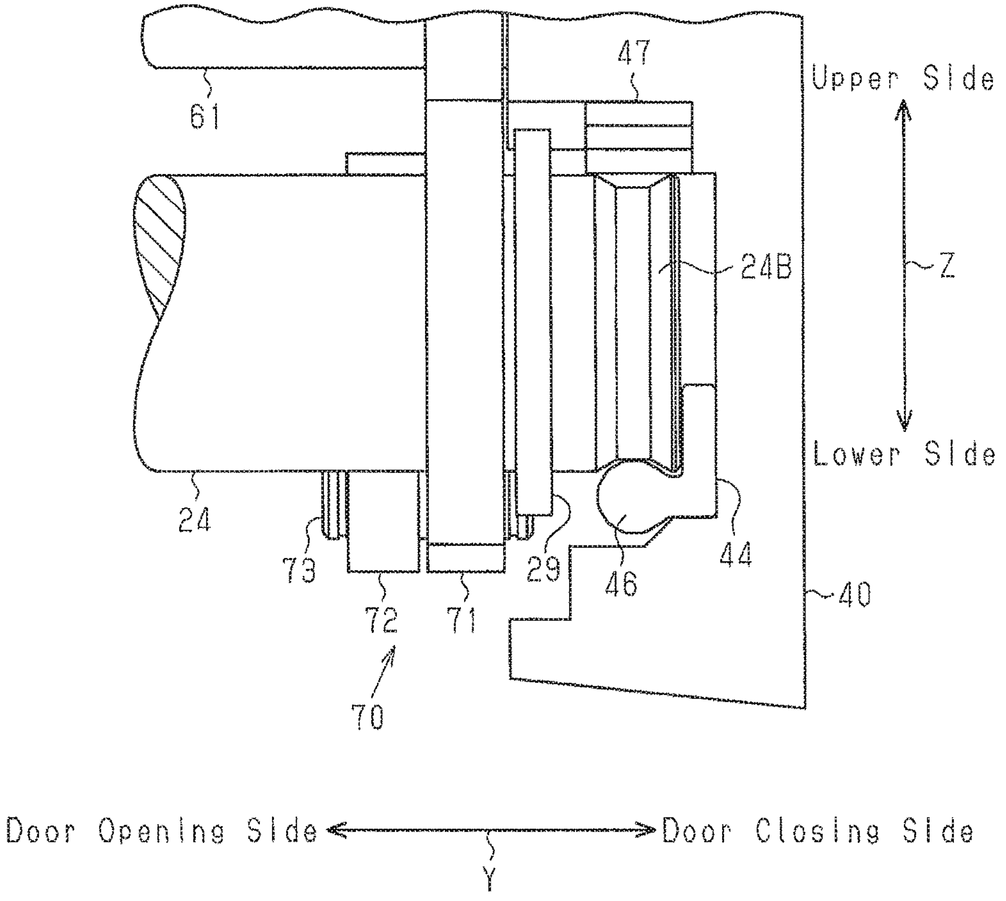
FIG. 19 is a front view of a modified example of a plug door opening-closing apparatus showing a frame and its surrounding.

The door driving mechanism 20 may include recesses 24B, which are formed in the circumferences of two opposite ends of the movable guide 24 and located on the support portions 46 of the corresponding rails 44 (refer to FIG. 19). In this case, the rotary bodies 27 may be omitted. The two opposite ends of the movable guide 24 are respectively held between the rails 44 and the stoppers 47 in the radial direction. In this case, the two opposite ends of the movable guide 24 including the recesses 24B each function as a rotary body.

Modified Example 24

Instead of the recesses 24B of the movable guide 24 and the rails 44 shown in FIG. 19, the two opposite ends of the movable guide 24 may be located on support surfaces of the corresponding frames 40. This allows for omission of the rotary bodies 27 and the rails 44. In this case, the support surfaces of the frames 40 each correspond to a guide support member, and the two opposite ends of the movable guide 24 each correspond to a rotary body.

Modified Example 25

The cover 43 of each frame 40 may have any length. For example, when the cover 43 is formed in a range from an inner end to an outer end of the base 41, the stopper 47 may be omitted.

Modified Example 26

The link arms 29 may have any shape and be, for example, plate-like.

Modified Example 27

The door driving mechanism 20, which moves the door hanger 25 in the front-rear direction, may be of a type in which the threaded shaft 21 is rotated with the motor 23, a belt drive transmission device, or of a rack and pinion type.

Modified Example 28

The door opening type of the plug door device 1 may be of a double door type. For example, a pair of swing arm mechanisms 4 may correspond to a pair of the door panels 2.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description, with each claim standing on its own as a separate embodiment. The scope of the invention should be determined with reference to the appended claims, along with the full scope of equivalents to which such claims are entitled.

The invention claimed is:

1. A door driving mechanism comprising:

a threaded shaft extending in a vehicle front-rear direction;

a nut engaged with the threaded shaft to move a door hanger and a door in the front-rear direction; and a motor incorporating the nut which rotates the nut and moves in the front-rear direction together with the nut which moves the door hanger and door when activated, wherein the threaded shaft is configured to move together with the motor, and the nut and the door in a vehicle width direction that intersects with or is orthogonal to the front-rear direction.

2. The door driving mechanism according to claim 1, wherein the motor and the nut are configured to reciprocally move relative to the threaded shaft.

3. The door driving mechanism according to claim 1, wherein the nut and the motor are configured to reciprocally move relative to the threaded shaft when the motor rotates the nut on the threaded shaft.

4. The door driving mechanism according to claim 1, wherein the door hanger is coupled to the motor.

5. The door driving mechanism according to claim 4, further comprising: a coupling member that couples the door hanger to the motor.

6. The door driving mechanism according to claim 1, wherein the nut and the motor are coaxial with the threaded shaft.

7. The door driving mechanism according to claim 1, wherein the door driving mechanism is for use in a door opening-closing apparatus adapted for use with a vehicle.

* * * * *